(12) United States Patent
Kang et al.

(10) Patent No.: US 8,755,275 B2
(45) Date of Patent: *Jun. 17, 2014

(54) SYSTEM AND METHOD FOR MANAGING RESOURCE IN COMMUNICATION SYSTEM

(75) Inventors: Hyunduk Kang, Gwangju (KR); Dong-Hun Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 25 days.

This patent is subject to a terminal disclaimer.

(21) Appl. No.: 13/339,712

(22) Filed: Dec. 29, 2011

(65) Prior Publication Data

US 2012/0195269 A1 Aug. 2, 2012

(30) Foreign Application Priority Data

Dec. 29, 2010 (KR) .................. 10-2010-0137984
Jun. 16, 2011 (KR) .................. 10-2011-0058732
Dec. 28, 2011 (KR) .................. 10-2011-0144401

(51) Int. Cl.
*H04L 12/28* (2006.01)
*H04W 4/00* (2009.01)
*H04J 3/16* (2006.01)
*G06F 15/173* (2006.01)

(52) U.S. Cl.
USPC ........ 370/230; 370/329; 370/395.2; 370/437; 709/226

(58) Field of Classification Search
USPC ............... 370/310–350, 431–463, 464–485, 370/229–241, 252, 400–408; 709/223–226, 709/229–236
See application file for complete search history.

(56) References Cited

U.S. PATENT DOCUMENTS

| 7,869,400 B2 * | 1/2011 | Hu et al. ................. 370/329 |
| 8,200,161 B2 * | 6/2012 | Walley et al. ............ 455/63.1 |
| 8,289,903 B2 | 10/2012 | Shan et al. |

(Continued)

FOREIGN PATENT DOCUMENTS

| EP | 2 083 593 A2 | 7/2009 |
| KR | 1020060060452 A | 6/2006 |

(Continued)

OTHER PUBLICATIONS

Junyi Wang, et al; "Proposal for Chapter 6", IEEE 802. 19 Wireless Coexistence Working Group IEEE P802. 19-11/71r1; Date Submitted: Jul. 18, 2011; 51 pages.

(Continued)

*Primary Examiner* — Tri H Phan
(74) *Attorney, Agent, or Firm* — Ladas & Parry LLP

(57) ABSTRACT

A system for managing resources in a communication system including systems, which do not have a permission for a first frequency band, includes coexistence managers configured to, when a frequency band available for the systems is searched from the first frequency band, manage the systems for coexistence and frequency sharing of the systems in the available frequency band; a coexistence enabler configured to transmit and receive information of the systems and information of the coexistence managers; and a coexistence discovery and information server configured to support control of the coexistence managers over the systems, wherein predetermined messages are transmitted and received among the coexistence discovery and information server, the coexistence managers and the coexistence enabler to perform a registration procedure, a coexistence information gathering procedure, a coexistence decision making procedure, a reconfiguration procedure, a management procedure and an event procedure, for the coexistence and frequency sharing of the systems.

20 Claims, 14 Drawing Sheets

(56) References Cited

U.S. PATENT DOCUMENTS

| | | | |
|---|---|---|---|
| 8,310,991 B2 * | 11/2012 | Kasslin et al. | 370/328 |
| 8,363,602 B2 * | 1/2013 | Junell et al. | 370/328 |
| 8,379,586 B2 * | 2/2013 | Kasslin et al. | 370/329 |
| 8,385,286 B2 * | 2/2013 | Junell et al. | 370/329 |
| 8,451,789 B2 * | 5/2013 | Junell et al. | 370/329 |
| 8,514,802 B2 * | 8/2013 | Junell | 370/329 |
| 8,615,250 B2 * | 12/2013 | Xing | 455/454 |
| 2007/0223508 A1 | 9/2007 | Nandagopalan | |
| 2008/0108366 A1 | 5/2008 | Hu | |
| 2009/0059856 A1 | 3/2009 | Kermoal et al. | |
| 2010/0061326 A1 * | 3/2010 | Lee et al. | 370/329 |
| 2010/0124254 A1 | 5/2010 | Wu et al. | |
| 2011/0032892 A1 | 2/2011 | Bahl et al. | |
| 2011/0075586 A1 | 3/2011 | Hu et al. | |
| 2011/0096770 A1 | 4/2011 | Henry | |
| 2011/0116458 A1 | 5/2011 | Hsu et al. | |
| 2011/0116484 A1 | 5/2011 | Henry | |
| 2011/0164580 A1 | 7/2011 | Keon | |
| 2011/0164581 A1 | 7/2011 | Keon | |
| 2011/0250858 A1 | 10/2011 | Jain et al. | |
| 2011/0286401 A1 | 11/2011 | Wijting et al. | |
| 2011/0287802 A1 | 11/2011 | Ma et al. | |
| 2012/0058790 A1 | 3/2012 | Junell et al. | |
| 2012/0106364 A1 * | 5/2012 | Kasslin et al. | 370/252 |
| 2012/0108179 A1 | 5/2012 | Kasslin et al. | |
| 2012/0113906 A1 * | 5/2012 | Kadous et al. | 370/329 |
| 2012/0115525 A1 * | 5/2012 | Kang et al. | 455/509 |
| 2012/0117243 A1 * | 5/2012 | Lee et al. | 709/226 |
| 2012/0195270 A1 * | 8/2012 | Kang et al. | 370/329 |
| 2012/0201208 A1 * | 8/2012 | Kang et al. | 370/329 |
| 2012/0201209 A1 * | 8/2012 | Lee et al. | 370/329 |
| 2012/0314681 A1 | 12/2012 | Chen et al. | |
| 2013/0051279 A1 | 2/2013 | Lee et al. | |
| 2013/0155995 A1 | 6/2013 | Jo et al. | |
| 2013/0155998 A1 * | 6/2013 | Jo et al. | 370/329 |
| 2013/0157681 A1 | 6/2013 | Jo et al. | |
| 2013/0157706 A1 | 6/2013 | Jo et al. | |
| 2013/0165136 A1 * | 6/2013 | Kang et al. | 455/454 |
| 2013/0165170 A1 | 6/2013 | Kang | |

FOREIGN PATENT DOCUMENTS

| | | |
|---|---|---|
| KR | 1020070048171 A | 5/2007 |
| KR | 1020100053643 A | 5/2010 |
| KR | 1020110089262 A | 8/2011 |

OTHER PUBLICATIONS

Jihyun Lee; et al; "Coexistence Procedures and Protocols", IEEE 802. 19 Wireless Coexistence Working Group IEEE P802. 19-11/0009r1; Date Submitted: Jan. 17, 2011; 87 pages.

USPTO NOA mailed Jan. 10, 2014 in connection with U.S. Appl. No. 13/339,727.

\* cited by examiner

SYSTEM AND METHOD FOR MANAGING RESOURCE IN COMMUNICATION SYSTEM

CROSS-REFERENCES TO RIMMED APPLICATIONS

The present application claims priority of Korean Patent Application Nos. 10-2010-0137984, 10-2011-0058732, and 10-2011-0144401, filed on Dec. 29, 2010, Jun. 16, 2011, and Dec. 28, 2011, respectively, which are incorporated herein by reference in their entirety.

BACKGROUND OF THE INVENTION

1. Field of the Invention

Exemplary embodiments of the present invention relate to a communication system, and more particularly, to a system and a method for managing resources in a communication system so as to share a plurality of frequency resources in the communication system.

2. Description of Related Art

In a current communication system, research for providing services of various qualities of service (hereinafter, referred to as 'QoSs') to users at a high transmission rate has been actively conducted. In such a communication system, research for providing large-capacity services having various QoSs using limited resources, for example, frequency resources, has been actively conducted. In particular, due to development of radio communication technologies and introduction of new wireless communication services, there is a need to efficiently use limited frequency resources.

As a method for increasing efficiency of using limited frequency resources in a communication system, there have been suggested methods for optimizing performance of the communication system, for example, methods for minimizing interference with other types of communication systems while maximizing spectral efficiency by using multiple access, encoding, modulation, information compression, etc. Also, there has been suggested a frequency sharing method for increasing frequency resource utilization efficiency by using a frequency band available from an already used frequency band such as a TV band.

Here, the frequency sharing of the frequency band available from the already used frequency band such as a TV band needs to use the available frequency band without providing interference to a primary incumbent having a preemptive permission for the TV band. Therefore, it is important to detect the available frequency band by confirming whether or not the primary incumbent uses the available frequency band in the TV band. Further, in the case where a plurality of different systems intending to use the available frequency band detected in the TV band exist, a problem is caused in terms of coexistence for using the available frequency band due to a difference in communication pattern, for example, in wireless access pattern, among the plurality of different systems.

In other words, in the current communication system, in the case where the plurality of different systems intending to use the available frequency band detected in the TV band exist as described above, a detailed method for managing resources for allowing the plurality of different systems to efficiently use the detected available frequency band is not provided. In particular, a method for efficiently using frequency resources through coexistence of the systems adopting different communication patterns so as to use the available frequency band is not provided.

Therefore, a need exists for a method for managing resources for efficiently using the detected available frequency band through coexistence of the plurality of different systems, for example, the different communication patterns of systems, after detecting the available frequency band from the already used frequency band such as a TV band in the communication system.

SUMMARY OF THE INVENTION

An embodiment of the present invention is directed to a system and a method for managing resources in a communication system.

Another embodiment of the present invention is directed to a system and a method for managing resources so as to efficiently use frequency bands among frequency bands used in advance in a communication system by coexistence of a plurality of systems.

Another embodiment of the present invention is directed to a system and a method for managing frequency resources so as to use available frequency bands in a TV band by coexistence of a plurality of systems in a communication system.

Another embodiment of the present invention is directed to a system and a method for managing frequency resources so as to use available frequency bands of a TV band by efficient coexistence and frequency sharing of a plurality of systems in the available frequency bands in a communication system.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention, a system for managing resources in a communication system including a plurality of systems, which do not have a permission for a first frequency band, includes: a coexistence manager configured to, when a frequency band available for the plurality of systems is searched from the first frequency band, manage the plurality of systems for coexistence and frequency sharing of the plurality of systems in the available frequency band; a coexistence enabler configured to transmit and receive information of the plurality of systems and information of the coexistence manager; and a coexistence discovery and information server configured to support control of the coexistence manager over the plurality of systems, wherein a plurality of coexistence managers are provided to respectively correspond to the plurality of systems, and wherein predetermined messages are transmitted and received among the coexistence discovery and information server, the plurality of coexistence managers and the coexistence enabler to perform a registration procedure, a coexistence information gathering procedure, a coexistence decision making procedure, a reconfiguration procedure, a management procedure and an event procedure, for the coexistence and frequency sharing of the plurality of systems.

In accordance with another embodiment of the present invention, a method for managing resources of a first frequency band in a communication system including a plurality of systems, which do not have a permission for the first frequency band, includes: transmitting and receiving, when a frequency band available for the plurality of systems is searched from the first frequency band, registration request messages and registration response messages among a coexistence discovery and information server, a plurality of coexistence managers and a coexistence enabler, in a registration procedure, for coexistence and frequency sharing of the plurality of systems in the available frequency band; transmitting and receiving coexistence information request messages and coexistence information response messages among the coexistence discovery and information server, the plurality of coexistence managers and the coexistence enabler, in a coexistence information gathering procedure, for the coexistence and frequency sharing of the plurality of systems; transmitting and receiving command request messages and command response messages and negotiation request messages and negotiation response messages among the plurality of coexistence managers, and transmitting and receiving channel classification request messages and channel classification response messages by the coexistence enabler, in a coexistence decision making procedure, for the coexistence and frequency sharing of the plurality of systems; transmitting and receiving reconfiguration request messages and reconfiguration response messages by the plurality of coexistence managers and the coexistence enabler, in a reconfiguration procedure, for the coexistence and frequency sharing of the plurality of systems; transmitting and receiving management request messages and management response messages by the plurality of coexistence managers and the coexistence enabler, in a management procedure, for the coexistence and frequency sharing of the plurality of systems; and transmitting and receiving event indication messages and event acknowledgement messages among the coexistence discovery and information server, the plurality of coexistence managers and the coexistence enabler, in an event procedure, for the coexistence and frequency sharing of the plurality of systems.

DESCRIPTION OF SPECIFIC EMBODIMENTS

Figure 1:
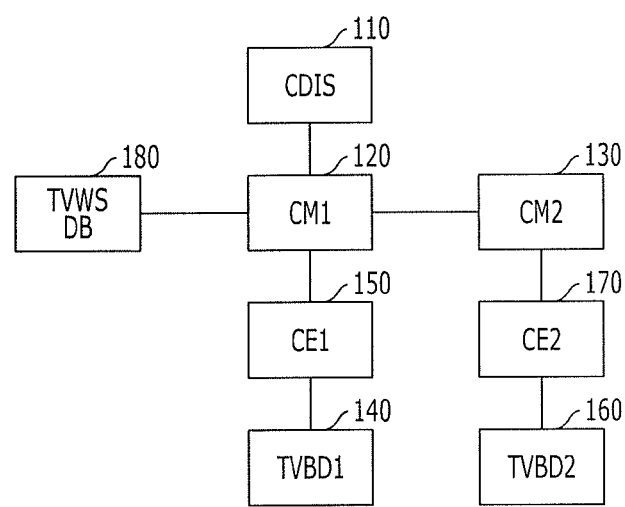
FIG. 1 is a diagram schematically showing a structure of a system for managing resources in a communication system in accordance with an exemplary embodiment of the present invention.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

An Embodiment of the present invention proposes a system and a method for managing resources, capable of detecting an available frequency band, for example, an idle frequency band (a white space: hereinafter, referred to as a 'WS'), from an already used frequency band such as a TV band in a communication system, for example, a cognitive radio (hereinafter, referred to as 'CR') system, an IEEE 802.19-based system or an IEEE 802.22-based system, and of effectively using the detected available frequency band. Here, while the embodiment of the present invention is described by exemplifying the CR system and the IEEE 802.19-based and IEEE 802.22-based systems, it is to be noted that the method for managing resources proposed in the embodiment of the present invention may be applied to other communication systems.

Also, the embodiment of the present invention proposes a system and a method for managing resources so as to use a frequency band available from a TV band through coexistence of a plurality of different systems in a communication system. Here, the embodiment of the present invention provides coexistence of respective objects of the system for managing resources for providing the sharing of the available frequency band in the communication system and provides coexistence of a plurality of different systems, in particular, systems using different communication patterns, for example, different wireless access patterns, so as to share the available frequency band available from the already used frequency band such as a TV band, thereby improving frequency resource utilization efficiency.

That is, the embodiment of the present invention allows the system for managing resources for the coexistence and the frequency sharing among the plurality of different systems in the communication system to share the available frequency band, thereby improving the efficiency of using limited frequency resources. Here, the embodiment of the present invention shares a frequency in the available frequency band from the already used frequency band such as a TV band. In this regard, the embodiment of the present invention need to use the available frequency band without providing interference to a primary incumbent having a preemptive permission for the TV band. To this end, the embodiment of the present invention detects the available frequency band by confirming whether the primary incumbent uses the frequency band in the TV band, and selects and uses operating channels in the detected available frequency band through the coexistence and the frequency sharing of the plurality of difference systems intending to use the available frequency band detected from the TV band. In other words, in the embodiment of the present invention, the system for managing resources for the coexistence and the frequency sharing among the plurality of different systems in the communication systems allows predetermined objects to select the operating channels in the WS for efficient coexistence. In this case, the embodiment of the present invention classifies channels available in the WS for effective selection of the operating channels in the WS and allocates the classified channels.

Here, in order for efficient coexistence and frequency sharing among the plurality of different systems in the band available from the TV band, that is, in a TVWS, the system for managing resources performs message transmission and reception procedures. In other words, in order for efficient coexistence and frequency sharing of the plurality of different systems which use the TVWS, the system for managing resources transmits and receives messages among the respective objects of the system for managing resources. In particular, the system for managing resources transmits and receives messages regarding registration, coexistence information gathering, coexistence decision making, reconfiguration, management and an event, thereby improving efficiencies of the coexistence and frequency sharing of the plurality of different systems in the TVWS.

That is to say, in order for the efficient coexistence and frequency sharing of the plurality of different systems in the TVWS, in the system for managing resources according to the embodiment of the present invention, a registration procedure and a message in the registration procedure are defined, and a coexistence information gathering procedure and a message in the coexistence information gathering procedure are defined. Further, in the system for managing resources, a coexistence decision making procedure and a message in the coexistence decision making procedure are defined, a reconfiguration procedure and a message in the reconfiguration procedure are defined, a management procedure and a message in the management procedure are defined, and an event procedure and a message in the event procedure are defined. Namely, in order for the efficient coexistence and frequency sharing of the plurality of different systems in the TVWS, the messages defined in this way are transmitted and received among the respective objects of the system for managing resources, and the defined procedures are performed, thereby improving the efficiencies of the coexistence and frequency sharing of the plurality of different systems in the TVWS. Here, the system for managing resources in a communication system in accordance with the embodiments of the present invention will be described in more detail with reference to FIG. 1.

FIG. 1 is a diagram schematically illustrating a structure of a system for managing resources in a communication system in accordance with an embodiment of the present invention.

Referring to FIG. 1, when a plurality of different systems intend to use a frequency band available from an already used frequency band such as a TV band, that is, a TVWS, the system for managing resources includes sharing devices intending to use the available frequency band through frequency sharing among the plurality of different systems, for example, a TV band device 1 (hereinafter, referred to as 'TVBD1') 140 and a TVBD2 160, coexistence managers (hereinafter, referred to as 'CMs') managing the TVBDs 140 and 160 for improving frequency sharing efficiency between the TVBDs 140 and 160, for example, a CM1 120 and a CM2 130, coexistence enablers (hereinafter, referred to as 'CEs') included in the TVBDs 140 and 160 or independently located to serve as passages between the TVBDs 140 and 160 and the CMs 120 and 130, for example, a CE1 150 and a CE2 170, a server supporting control of the TVBDs 140 and 160 by the CMs 120 and 130, for example, a coexistence discovery and information server (hereinafter, referred to as 'CDIS'), and a TVWS data base 180 (hereinafter, referred to as 'TVWS DB') providing channel information for the band available from the TV band, that is, the TVWS. Here, the system for managing resources includes the CEs, the CMs, the CDIS and the TVWS DB as objects for coexistence and frequency sharing of the plurality of systems, that is, the TVBDs, in the TVWS.

The TVBDs 140 and 160 mean devices of the plurality of different systems, that is, secondary systems, allowing other users (hereinafter, referred to as the 'secondary systems') who do not have a preemptive permission for the TV band, to detect and use a predetermined frequency band as the available frequency band from the TV band, when a primary incumbent (hereinafter, referred to as a 'primary system') having the preemptive permission for the TV band does not use the predetermined frequency band in the TV band as aforementioned above. Here, the TVBDs 140 and 160 share and use the predetermined frequency band through the coexistence and the frequency sharing so as to efficiently use limited frequency resources. That is, the TVBDs 140 and 160 are allocated with channels from the TVWS, and transmit and receive data.

The CEs 150 and 170 are independently located in the TVBDs 140 and 160 as described above, and transmit and receive the information of the TVBDs 140 and 160 and the information of the CMs 120 and 130. Here, while it is mainly described in the embodiment of the present invention for the sake of convenience in explanation that the CEs 150 and 170 independently exist in the TVBDs 140 and 160, it is to be noted that the CEs 150 and 170 may be included in the TVBDs 140 and 160 or the CMs 120 and 130.

In addition, the CEs 150 and 170 extract context information associated with the corresponding TVBDs 140 and 160, requested by the respective CMs 120 and 130, for example, information such as a wireless access pattern, transmission power, a spectral sensing threshold value, a position and so forth of the TVBDs 140 and 160, from the TVBDs 140 and 160, and transmit the extracted context information to the CMs 120 and 130. That is to say, the CEs 150 and 170 acquire the communication-related information of respective systems as the context information on different secondary systems, and transmit the acquired information to the CMs 120 and 130.

Further, the CEs 150 and 170 receive requests from the CMs 120 and 130 for management of the TVBDs 140 and 160, for example, requests for the context information and the configurations of the TVBDs 140 and 160, and in response to the requests, update the context information of the TVBDs 140 and 160 and reset, that is, reconfigure the configurations of the TVBDs 140 and 160. In other words, the CEs 150 and 170 receive changed information of the context information, that is, event information of the TVBDs 140 and 160, as the requests for the context information of the TVBDs 140 and 160, and update the context information of the TVBDs 140 and 160 according to the event information. Moreover, the CEs 150 and 170 receive resetting of the components of the TVBDs 140 and 160 as the requests for the configurations of the TVBDs 140 and 160, and reset, that is, reconfigure the components of the TVBDs 140 and 160 according to the resetting of the components.

The CMs 120 and 130 determine operation frequency allocation, transmission power allocation, transmission time allocation, and so forth, so as to improve the frequency sharing efficiency between the TVBDs 140 and 160. In other words, the CMs 120 and 130 perform the operation frequency allocation, the transmission power allocation, and the transmission time allocation for the TVBDs 140 and 160 in the available frequency band so as to improve the frequency sharing efficiency between the TVBDs 140 and 160 for the available frequency band in the above-described TV band.

Here, the CMs 120 and 130 perform the operation frequency allocation, the transmission power allocation, and the transmission time allocation for the corresponding TVBDs in the available frequency band by transmitting and receiving information, for example, the context information and the event information of the TVBDs, to and from the CMs, for example, neighbor CMs, of the TVBDs that do not correspond to the CMs 120 and 130, so as to more improve the frequency sharing efficiency between the TVBDs 140 and 160. In this case, the CMs 120 and 130 acquire the context information and the event information of the TVBDs that do not correspond to the CMs 120 and 130, through direct transmission and reception to and from other CMs (for example, neighbor CMs) or transmission and reception via the CDIS 110 to and from other CMs. Further, the CMs 120 and 130 acquire information on the use of a spectrum in the primary system, that is, channel information on channels available in the TV band, through an external data base, for example, the TVWS DB 180, or request resetting of the components the TVBDs corresponding to the CMs 120 and 130, to other CMs.

As described above, the CDIS 110 supports the control operation of the CMs 120 and 130 for frequency sharing of the TVBDs 140 and 160 for the available frequency band in the TV band. Namely, the CDIS 110 receives and stores the context information and the event information of the TVBDs 140 and 160 from the CMs 120 and 130, and transmits the context information and the event information of the TVBDs 140 and 160 to the CMs 120 and 130 according to requests from the CMs 120 and 130. Furthermore, the CDIS 110 acquires and stores the information on the use of a spectrum in the primary system, that is, the channel information on channels available in the TV band, through the external data base, for example, the TVWS DB 180.

The TVWS DB 180 provides channel information on channels available in the TVWS, that is, shared channel information, to the CMs 120 and 130. The channel information is provided only to the TVBDs that are registered in the TVWS DB 180 and have authorized identification numbers.

The system for managing resources in a communication system in accordance with the embodiment of the present invention includes the TVWS DB 180, the CDIS 110, the CMs 120 and 130, and the CEs 140 and 160, so as to allow the secondary systems to share and use the frequency band available from the frequency band already used by the primary system, such as the TV band, that is, so as to allow coexistence and frequency sharing of the TVBDs 140 and 160. Here, the TVBDs 140 and 160 as devices of the secondary systems for sharing and using the available frequency band as described above may include a base station (hereinafter, referred to as 'BS'), an access point (hereinafter, referred to as 'AP'), a service access point (hereinafter, referred to as 'SAP'), a terminal, or the like. Also, the secondary systems as the plurality of different systems for sharing the available frequency band as described above may include different communication patterns of systems, for example, an IEEE 802.19-based system, an IEEE 802.22-based system, or the like.

Besides, the system for managing resources in a communication system in accordance with the embodiment of the present invention transmits and receives predetermined messages so as to provide the coexistence and the frequency sharing of the TVBDs 140 and 160 for the frequency band available in the already used frequency band, in particular, so as to provide the efficient coexistence and frequency sharing of the plurality of systems, for example, the TVBDs 140 and 160, in the TVWS as described above, and performs a registration procedure, a coexistence information gathering procedure, a coexistence decision making procedure, a reconfiguration procedure, a management procedure, and an event procedure. In other words, these procedures are performed through transmission and reception of the predetermined messages among the respective objects of the system for managing resources so that frequency utilization efficiency may be improved through the effective coexistence and frequency sharing of the plurality of systems in the TVWS.

The system for managing resources operates in a management mode and an autonomous mode (or an information mode). In the management mode, the system for managing resources reflects the frequency sharing devices indicated by the CMs, that is, the setting of the TVBDs and the resetting of the configurations of the TVBDs, on the TVBDs. In the autonomous mode, the system for managing resources makes by itself a decision on the coexistence and frequency sharing, on the basis of the information regarding the coexistence and frequency sharing, which is received by the CEs from the CMs. The decision made on the coexistence and frequency sharing is reflected on the TVBDs on which the setting of the TVBDs and the resetting of the configurations of the TVBDs are reflected. Also, the system for managing resources operates in a centralized topology and a distributed topology. In the centralized topology, among a plurality of CMs, a plurality of slave CMs are connected to one optional master CM. The slave CMs are controlled by the master CM for coexistence and frequency sharing among TVBDs. In the distributed topology, coexistence and frequency sharing among the TVBDs are implemented through negotiation between one optional CM and neighbor CMs of the one CM among a plurality of CMs. Hereafter, a registration procedure of the system for managing resources in a communication system in accordance with the exemplary embodiment of the present invention will be described with reference to FIGS. 2, 4A and 4B, and a deregistration procedure of the system for managing resources in a communication system in accordance with the exemplary embodiment of the present invention will be described with reference to FIGS. 3, 5A and 5B.

Figure 2:
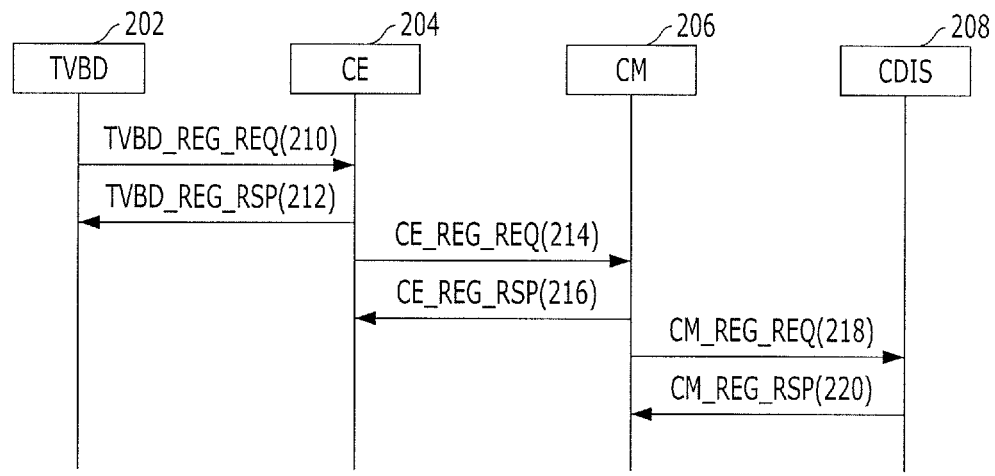
FIG. 2 is a diagram schematically showing a registration procedure of the system for managing resources in a communication system in accordance with the exemplary embodiment of the present invention.

FIG. 2 is a diagram schematically showing a registration procedure of the system for managing resources in a communication system in accordance with the exemplary embodiment of the present invention. Here, FIG. 2 is a diagram schematically showing a message transmission and reception procedure among respective objects of the system for managing resources in the registration procedure.

Referring to FIG. 2, in order for coexistence and frequency sharing in the TVWS, a TVBD 202 should be registered in a CM 206. In order for the TVBD 202 to be registered n the CM 206, the TVBD 202 transmits a TVBD registration request (hereinafter, referred to as 'TVBD_REG_REQ') message to a CE 204 (step 210). Further, the TVBD 202 receives a TVBD registration response (hereinafter, referred to as 'TVBD_REG_RSP') message, from the CE 204 as a response to the TVBD_REG_REQ message (step 212).

After the CE 204 receives the TVBD_REG_REQ message from the TVBD 202 and confirms the registration request for the coexistence and frequency sharing of the TVBD 202 in the TVWS, the CE 204 transmits a CE registration request (hereinafter, referred to as 'CE_REG_REQ') message to the CM 206, for registration of the TVBD 202 in the CM 206 (step 214). Here, the CE_REG_REQ message is a message which requests the registration of the TVBD 202 in the CM 206, for the coexistence and frequency sharing of the TVBD 202 in the TVWS, as described above. The CE_REG_REQ message is used in the same manner in the centralized topology, the distributed topology and the autonomous mode of the system for managing resources. The contents of the CE_REG_REQ message, that is, the header and payload of the CE_REG_REQ message may be presented as in Table 1.

TABLE 1

| Name | Data Type | Description |
| --- | --- | --- |
| Header | | |
| SourceID | CE ID | Source identifier |
| DestinationID | CM ID | Destination identifier |
| Payload | | |
| ServiceType | BOOLEAN | Service type, including Discovery service Management service |

The CE 204 receives a CE registration response (hereinafter, referred to as 'CE_REG_RSP') message which notifies the registration result of the TVBD 202 in the CM 206, from the CM 206 as a response to the CE_REG_REQ message (step 216). Here, the CE_REG_RSP message as a response message of the CE_REG_REQ message, which requests the registration of the TVBD 202 in the CM 206, is a message through which the CM 206 notifies the CE 204 of the registration result of a corresponding TVBD, that is, the TVBD 202, for the coexistence and frequency sharing of the TVBD 202 in the TVWS, as described above. The CE_REG_RSP message is used in the same manner in the centralized topology, the distributed topology and the autonomous mode of the system for managing resources. The contents of the CE_REG_RSP message, that is, the header and payload of the CE_REG_RSP message may be presented as in Table 2.

TABLE 2

| Name | Data Type | Description |
| --- | --- | --- |
| Header | | |
| SourceID | CM ID | Source identifier |
| DestinationID | CE ID | Destination identifier |
| Payload | | |
| ServiceTypeStatus | BOOLEAN | Status of service type True: Subscription of the corresponding service type is succeed. False: Subscription of the corresponding service type is failed. |

Further, the CM 206 transmits a CM registration request (hereinafter, referred to as "CM_REG_REQ") message which requests registration of the CM 206 itself, to a CDIS 208, so as to register the CM 206 in CMs neighboring to the CM 206 (step 218). Here, the CM_REG_REQ message is a message which requests the registration of the CM 206 in the neighbor CMs, in particular, the registration of the CM 206 in the neighbor CMs in the distributed topology, for the coexistence and frequency sharing of the TVBD 202 in the TVWS, as described above. The CM_REG_REQ message is used in the same manner in the centralized topology, the distributed topology and the autonomous mode of the system for managing resources. The contents of the CM_REG_REQ message, that is, the header and payload of the CM_REG_REQ message may be presented as in Table 3.

TABLE 3

| Name | Data Type | Description |
| --- | --- | --- |
| Header | | |
| SourceID | CM ID | Source identifier |
| DestinationID | CDIS ID/Neighbor CM ID | Destination identifier |
| Payload | | |
| None | | |

The CM 206 receives a CM registration response (hereinafter, referred to as 'CM_REG_RSP') message which notifies the result of the registration of the CM 206 in the neighbor CMs, from the CDIS 208 as a response to the CM_REG_REQ message (step 220). Here, the CM_REG_RSP message as a response message of the CM_REG_REQ message, which requests the registration of the CM 206 in the neighbor CMs, is a message which is transmitted by the CDID 208 to the CM 206 to allow the neighbor CMs to notify the registration result of the corresponding CM, that is, the CM 206, to the CM 206, in particular, in the distributed topology, for the coexistence and frequency sharing of the TVBD 202 in the TVWS, as described above. The CM_REG_RSP message is used in the same manner in the centralized topology, the distributed topology and the autonomous mode of the system for managing resources. The contents of the CM_REG_RSP message, that is, the header and payload of the CM_REG_RSP message may be presented as in Table 4.

TABLE 4

| Name | Data Type | Description |
| --- | --- | --- |
| Header | | |
| SourceID | CDIS ID/Neighbor CM ID | Source identifier |
| DestinationID | CM ID | Destination identifier |
| Payload | | |
| RegistrationStatus | BOOLEAN | Status of registration True: Registration of the corresponding CM is succeed. False: Registration of the corresponding CM is failed. |

In this way, as the respective objects transmit and receive messages as described above, the system for managing resources performs the registration procedure for the coexistence and frequency sharing of the plurality of systems, for example, the TVBDs. Hereafter, a deregistration procedure of the system for managing resources in a communication system in accordance with the exemplary embodiment of the present invention will be described in detail with reference to FIG. 3.

Figure 3:
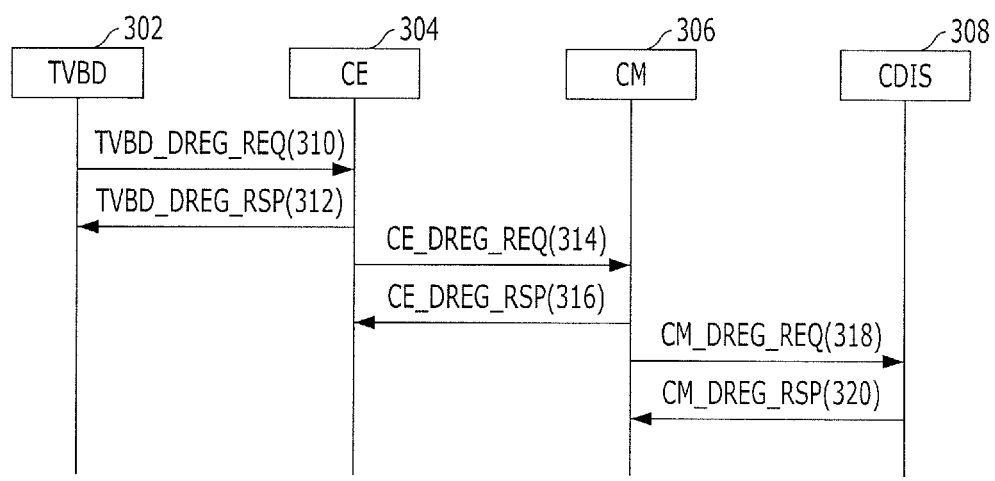
FIG. 3 is a diagram schematically showing a deregistration procedure of the system for managing resources in a communication system in accordance with the exemplary embodiment of the present invention.

FIG. 3 is a diagram schematically showing a deregistration procedure of the system for managing resources in a communication system in accordance with the exemplary embodiment of the present invention. FIG. 3 is a diagram schematically showing a message transmission and reception procedure among the respective objects of the system for managing resources, in the deregistration procedure.

Referring to FIG. 3, in order to end the coexistence and frequency sharing in the TVWS, a TVBD 302 should be deregistered from a CM 306. In order for the TVBD 302 to be deregistered from the CM 306, the TVBD 302 transmits a TVBD deregistration request (hereinafter, referred to as 'TVBD_DREG_REQ') message to a CE 304 (step 310). The TVBD 302 receives a TVBD deregistration response (hereinafter, referred to as "TVBD_DREG_RSP') message, from the CE 304 as a response to the TVBD_DREG_REQ message (step 312).

Further, after the CE 304 receives TVBD_DREG_REQ message from the TVBD 302 and confirms the deregistration request for ending the coexistence and frequency sharing of the TVBD 302 in the TVWS, the CE 304 transmits a CE deregistration request (hereinafter, referred to as "CE_DREG_REQ') message to the CM 306, for deregistration of the TVBD 302 from the CM 306 (step 314). Here, the CE_DREG_REQ is a message which requests deregistration of the TVBD 302 from the CM 306 for ending the coexistence and frequency sharing of the TVBD 302 in the TVWS as described above. The CE_DREG_REQ message is used in the same manner in the centralized topology, the distributed topology and the autonomous mode of the system for managing resources. The contents of the CE_DREG_REQ message, that is, the header and payload of the CE_DREG_REQ message may be presented as in Table 5.

TABLE 5

| Name | Data Type | Description |
| --- | --- | --- |
| Header | | |
| SourceID | CE ID | Source identifier |
| DestinationID | CM ID | Destination identifier |
| Payload | | |
| None | | |

The CE 304 receives a CE deregistration response (hereinafter, referred to as 'CE_DREG_RSP') message which notifies the result of the deregistration of the TVBD 302 from the CM 306, from the CM 306 as a response to the CE_DREG_REQ (step 316). Here, the CE_DREG_RSP message as a response message of the CE_DREG_REQ message, which requests the deregistration of the TVBD 302 from the CM 306, for ending the coexistence and frequency sharing of the TVBD 302 in the TVWS as described above, is a message through which the CM 306 notifies the deregistration result of a corresponding TVBD, that is, the TVBD 302, to the CE 304. The CE_DREG_RSP message is used in the same manner in the centralized topology, the distributed topology and the autonomous mode of the system for managing resources. The contents of the CE_DREG_RSP message, that is, the header and payload of the CE_DREG_RSP message may be presented as in Table 6.

TABLE 6

| Name | Data Type | Description |
| --- | --- | --- |
| Header | | |
| SourceID | CM ID | Source identifier |
| DestinationID | CE ID | Destination identifier |

TABLE 6-continued

| Name | Data Type | Description |
| --- | --- | --- |
| Payload | | |
| DeregistrationStatus | BOOLEAN | Status of de-registration True: De-registration of the corresponding TVBD is succeed. False: De-registration of the corresponding TVBD is failed. |

In order for the CM 306 to be deregistered from CMs neighboring to the CM 306, the CM 306 transmits a CM deregistration request (hereinafter, referred to as 'CM_DREG_REQ') message which requests deregistration of the CM 306 itself, to a CDIS 308 (step 318). Here, the CM_DREG_REQ message is a message which requests deregistration of the CM 306 from the neighbor CMs, in particular, deregistration of the CM 306 from the neighbor CMs in the distributed topology, for ending the coexistence and frequency sharing of the TVBD 302 in the TVWS as described above. The CM_DREG_REQ message is used in the same manner in the centralized topology, the distributed topology and the autonomous mode of the system for managing resources. The contents of the CM_DREG_REQ message, that is, the header and payload of the CM_DREG_REQ message may be presented as in Table 7.

TABLE 7

| Name | Data Type | Description |
| --- | --- | --- |
| Header | | |
| SourceID | CM ID | Source identifier |
| DestinationID | CDIS ID/Neighbor CM ID | Destination identifier |
| Payload | | |
| None | | |

The CM 306 receives a CM deregistration response (hereinafter, referred to as 'CM_DREG_RSP') message which notifies the result of deregistration of the CM 306 from the neighbor CMs, from the CDIS 308 as a response to the CM_DREG_REQ message (step 320). Here, the CM_DREG_RSP message as a response message of the CM_DREG_REQ message, which requests the deregistration of the CM 306 from the neighbor CMs, for ending the coexistence and frequency sharing of the TVBD 302 in the TVWS as described above, is a message which is transmitted to the CM 306 by the CDIS 308 such that the neighbor CMs notify the deregistration result of the corresponding CM, that is, the CM 306, in particular, in the distributed topology. The CM_DREG_RSP message is used in the same manner in the centralized topology, the distributed topology and the autonomous mode of the system for managing resources. The contents of the CM_DREG_RSP message, that is, the header and payload of the CM_DREG_RSP message may be presented as in Table 8.

TABLE 8

| Name | Data Type | Description |
| --- | --- | --- |
| Header | | |
| SourceID | CDIS ID/Neighbor CM ID | Source identifier |
| DestinationID | CM ID | Destination identifier |

TABLE 8-continued

| Name | Data Type | Description |
| --- | --- | --- |
| Payload | | |
| DeregistrationStatus | BOOLEAN | Status of de-registration<br>True: De-registration of the corresponding CM is succeed.<br>False: De-registration of the corresponding CM is failed. |

In this way, as the respective objects transmit and receive messages as described above, the system for managing resources performs the deregistration procedure for ending the coexistence and frequency sharing of the plurality of systems, for example, the TVBDs. Hereafter, registration procedures in respective topologies of the system for managing resources in a communication system in accordance with the exemplary embodiment of the present invention will be described in detail with reference to FIGS. 4A and 4B.

Figure 4A:
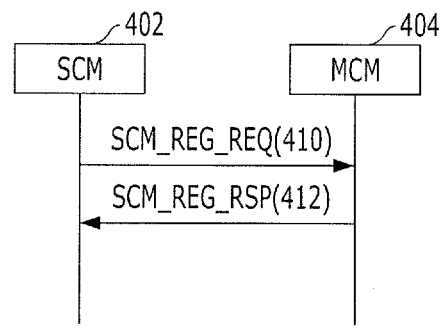
FIGS. 4A and 4B are diagrams schematically showing registration procedures in respective topologies of the system for managing resources in a communication system in accordance with the exemplary embodiment of the present invention.
Figure 4B:
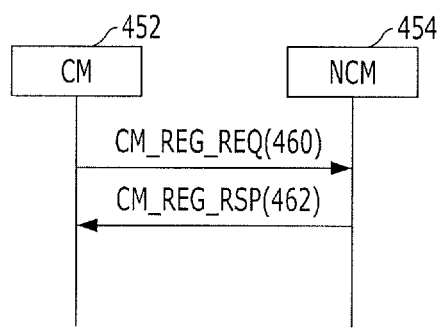

FIGS. 4A and 4B are diagrams schematically showing registration procedures in respective topologies of the system for managing resources in a communication system in accordance with the exemplary embodiment of the present invention. FIG. 4A is a diagram schematically showing a registration procedure of the system for managing resources in the centralized topology, in particular, a message transmission and reception procedure in the registration procedure among the respective objects of the system for managing resources, specifically, between a master CM and a slave CM. FIG. 4B is a diagram schematically showing a registration procedure of the system for managing resources in the distributed topology, in particular, a message transmission and reception procedure in the registration procedure among the respective objects of the system for managing resources, specifically, between a CM and a neighbor CM.

First, referring to FIG. 4A, in the centralized topology, in order for a slave CM (hereinafter, referred to as an 'SCM') 402 among a plurality of CMs for managing the plurality of systems of the system for managing resources to be registered in a master CM (hereinafter, referred to as 'MCM') 404 for controlling the SCM 402 itself among the plurality of CMs, the SCM 402 transmits an SCM registration request (hereinafter, referred to as 'SCM_REG_REQ') message which requests registration of the SCM 402 itself to the MCM 404 (step 410). Here, the SCM_REG_REQ message is a message which requests the registration of the SCM 402 in the MCM 404, in particular, the registration of the SCM 402 in the MCM 404 in the centralized topology, for the coexistence and frequency sharing of the TVBD in the TVWS as described above. The SCM_REG_REQ message is used in the centralized topology of the system for managing resources. The contents of the SCM_REG_REQ message, that is, the header and payload of the SCM_REG_REQ message may be presented as in Table 9.

TABLE 9

| Name | Data Type | Description |
| --- | --- | --- |
| Header | | |
| SourceID | Slave CM ID | Source identifier |
| DestinationID | Master CM ID | Destination identifier |

TABLE 9-continued

| Name | Data Type | Description |
| --- | --- | --- |
| Payload | | |
| RegisteredCEIDList | SEQUENCE OF STRING | Registered CE ID list including inter-CM neighbor TVBD |

The SCM 402 receives an SCM registration response (hereinafter, referred to as 'SCM_REG_RSP') message which notifies the registration result of the SCM 402 in the MCM 404, from the MCM 404 as a response to the SCM_REG_REQ message (step 412). Here, the SCM_REG_RSP message as a response message of the SCM_REG_REQ message, which requests the registration of the SCM 402 in the MCM 404 for the coexistence and frequency sharing of the TVBD in the TVWS as described above, is a message through which the MCM 404 notifies the registration result of the corresponding SCM, that is, the SCM 402, to the SCM 402, in particular, in the centralized topology. The SCM_REG_RSP message is used in the centralized topology of the system for managing resources. The contents of the SCM_REG_RSP message, that is, the header and payload of the SCM_REG_RSP message may be presented as in Table 10.

TABLE 10

| Name | Data Type | Description |
| --- | --- | --- |
| Header | | |
| SourceID | Master CM ID | Source identifier |
| DestinationID | Slave CM ID | Destination identifier |
| Payload | | |
| RegisteredCEIDList | SEQUENCE OF STRING | Registered CE ID list including inter-CM neighbor TVBD |
| The message contents below are repeated for each registered CE | | |
| RegisteredCEID | STRING | Registered CE ID |
| RegistrationStatus | BOOLEAN | Status of registration<br>True: Registration of the corresponding CE is succeed.<br>False: Registration of the corresponding CE is failed. |

Also, referring to FIG. 4B, in the distributed topology, in order for one optional CM 452 among the plurality of CMs, which manage the plurality of systems of the system for managing resources, to be registered in a CM 454 neighboring to the optional CM 452 among the plurality of CMs (hereinafter, referred to as an 'NCM'), the optional CM 452 transmits a CM_REG_REQ message which requests its registration, to the NCM 454 (step 460). Here, the CM_REG_REQ message is a message which requests the registration of the CM 452 in the NCM 454, in particular, the registration of the CM 452 in the NCM 454 in the distributed topology, for the coexistence and frequency sharing of the TVBD in the TVWS as described above, and is used in the distributed topology of the system for managing resources. The contents of the CM_REG_REQ message, that is, the header and payload of the CM_REG_REQ message are as given in Table 3.

Further, the CM 452 receives a CM_REG_RSP message which notifies the registration result of the CM 452 in the NCM 454, from the NCM 454 as a response to the CM_REG_REQ message (step 462). Here, the CM_REG_RSP message as a response message of the CM_REG_REQ message, which requests the registration of the CM 452 in the NCM 454 for the coexistence and frequency sharing of the TVBD 202 in the TVWS as described above, is a message through which the NCM 454 notifies the registration result of the corresponding CM, that is, the CM 452, to the CM 452, in particular, in the distributed topology, and is used in the distributed topology of the system for managing resources. The contents of the CM_REG_RSP message, that is, the header and payload of the CM_REG_RSP message are as given in Table 4.

In this way, as the respective objects, in particular, the SCM and the MCM and the optional CM and the NCM, transmit and receive messages as described above, the system for managing resources performs the registration procedure for the coexistence and frequency sharing of the plurality of systems, for example, the TVBDs. Hereafter, the deregistration procedure of the system for managing resources in a communication system in accordance with the exemplary embodiment of the present invention will be described in detail with reference to FIGS. 5A and 5B.

Figure 5A:
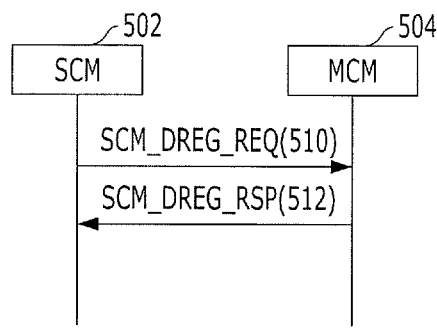
FIGS. 5A and 5B are diagrams schematically showing deregistration procedures in respective topologies of the system for managing resources in a communication system in accordance with the exemplary embodiment of the present invention.
Figure 5B:
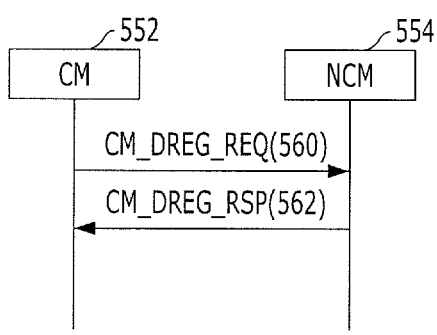

FIGS. 5A and 5B are diagrams schematically showing deregistration procedures in respective topologies of the system for managing resources in a communication system in accordance with the exemplary embodiment of the present invention. FIG. 5A is a diagram schematically showing a deregistration procedure of the system for managing resources in the centralized topology, in particular, a message transmission and reception procedure in the deregistration procedure among the respective objects of the system for managing resources, specifically, between an MCM and an SCM. FIG. 5B is a diagram schematically showing a deregistration procedure of the system for managing resources in the distributed topology, in particular, a message transmission and reception procedure in the deregistration procedure among the respective objects of the system for managing resources, specifically, between a CM and an NCM.

First, referring to FIG. 5A, in the centralized topology, in order for an SCM 502 among the plurality of CMs which manage the plurality of systems of the system for managing resources, to be deregistered from an MCM 504 in which the SCM 502 is registered, the SCM 502 transmits an SCM deregistration request (hereinafter, referred to as 'SCM_DREG_REQ') message which requests its deregistration, to the MCM 504 (step 510). Here, the SCM_DREG_REQ message is a message which requests the deregistration of the SCM 502 from the MCM 504 for ending the coexistence and frequency sharing of the TVBD in the TVWS as described above, in particular, the deregistration of the SCM 502 from the MCM 504 in the centralized topology. The SCM_DREG_REQ message is used in the centralized topology of the system for managing resources. The contents of the SCM_DREG_REQ message, that is, the header and payload of the SCM_DREG_REQ message may be presented as in Table 11.

TABLE 11

| Name | Data Type | Description |
|---|---|---|
| Header | | |
| SourceID | Slave CM ID | Source identifier |
| DestinationID | Master CM ID | Destination identifier |
| Payload | | |
| RegisteredCEIDList | SEQUENCE OF STRING | Registered CE ID list |
| The message contents below are repeated for each registered CE | | |
| Registered CE ID | SEQUENCE OF STRING | Registered CE ID list |
| None | | |

The SCM 502 receives an SCM deregistration response (hereinafter, referred to as 'SCM_DREG_RSP') message which notifies the deregistration result of the SCM 502 from the MCM 504, from the MCM 504 as a response to the SCM_DREG_REQ message (step 512). Here, the SCM_DREG_RSP message as a response message of the SCM_DREG_REQ message, which requests the deregistration of the SCM 502 from the MCM 504 for ending the coexistence and frequency sharing of the TVBD in the TVWS as described above, is a message through which the MCM 504 notifies the deregistration result of the corresponding CM, that is, the SCM 502, to the SCM 502, in particular, in the distributed topology. The SCM_DREG_RSP message is used in the centralized topology of the system for managing resources. The contents of the SCM_DREG_RSP message, that is, the header and payload of the SCM_DREG_RSP message may be presented as in Table 12.

TABLE 12

| Name | Data Type | Description |
|---|---|---|
| Header | | |
| SourceID | Master CM ID | Source identifier |
| DestinationID | Slave CM ID | Destination identifier |
| Payload | | |
| RegisteredCEIDList | SEQUENCE OF STRING | Registered CE ID list |
| The message contents below are repeated for each registered CE | | |
| RegisteredCEID | STRING | Registered CE ID |
| DeregistrationStatus | BOOLEAN | Status of de-registration True: De-registration of the corresponding TVBD is succeed. False: De-registration of the corresponding TVBD is failed. |

Also, referring to FIG. 5B, in the distributed topology, in order for one optional CM 552 among the plurality of CMs which manage the plurality of systems of the system for managing resources, to be deregistered from an NCM 554 neighboring to itself among the plurality of CMs, the optional CM 552 transmits a CM_DREG_REQ message which requests deregistration of itself, to the NCM 554 (step 560). Here, the CM_DREG_REQ message is a message which requests the deregistration of the CM 552 from the NCM 554, in particular, the deregistration of the CM 552 from the NCM 554 in the distributed topology, for ending the coexistence and frequency sharing of the TVBD in the TVWS as described above, and is used in the distributed topology of the system for managing resources. The contents of the CM_DREG_REQ message, that is, the header and payload of the CM_DREG_REQ message are as given in Table 7.

Further, the CM 552 receives a CM_DREG_RSP message which notifies the deregistration result of the CM 552 from the NCM 554, from the NCM 554 as a response to the CM_DREG_REQ message (step 562). Here, the CM_DREG_RSP message as a response message of the CM_DREG_REQ message, which requests the deregistration of the CM 552 from the NCM 554 for ending the coexistence and frequency sharing of the TVBD in the TVWS as described above, is a message through which the NCM 554 notifies the deregistration result of the corresponding CM, that is, the CM 552, to the CM 552, in particular, in the distributed topology, and is used in the distributed topology of the system for managing resources. The contents of the CM_DREG_RSP message, that is, the header and payload of the CM_DREG_RSP message are as given in Table 8.

In this way, as the respective objects, in particular, the SCM and the MCM and the optional CM and the NCM, transmit and receive messages as described above, the system for managing resources performs the deregistration procedure for ending the coexistence and frequency sharing of the plurality of systems, for example, the TVBDs. Hereafter, a coexistence information gathering procedure of the system for managing resources in a communication system in accordance with the exemplary embodiment of the present invention will be described in detail with reference to FIGS. 6 to 8.

Figure 6:
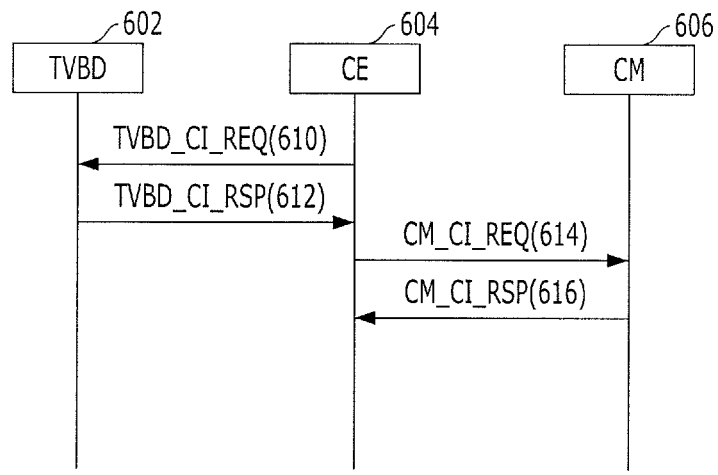
FIGS. 6 to 8 are diagrams schematically showing coexistence information gathering procedures of the system for managing resources in a communication system in accordance with the exemplary embodiment of the present invention.
Figure 7:
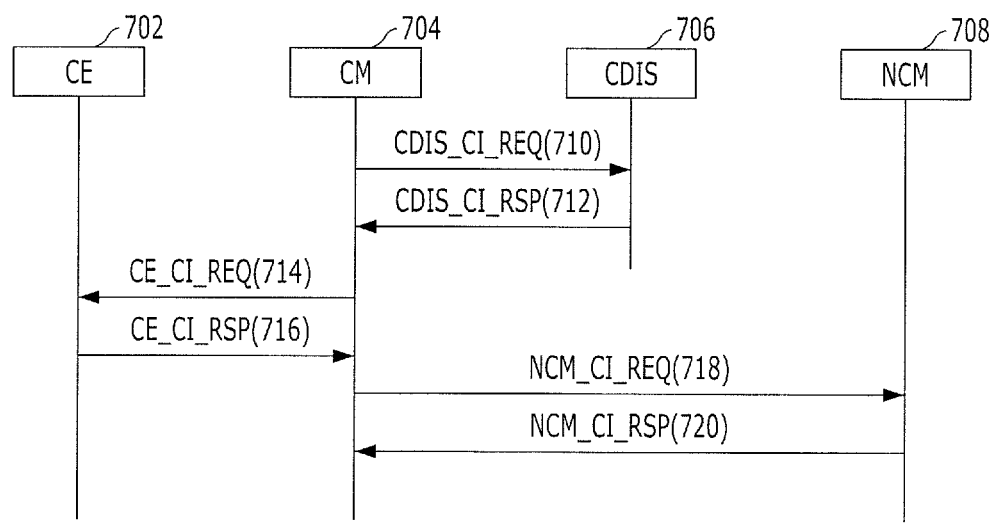
Figure 8:
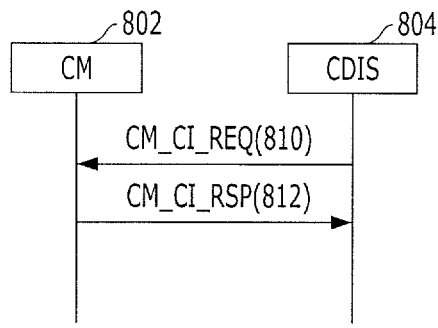

FIGS. 6 to 8 are diagrams schematically showing coexistence information gathering procedures of the system for managing resources in a communication system in accordance with the exemplary embodiment of the present invention. FIG. 6 is a diagram showing a coexistence information gathering procedure in a CE of the system for managing resources, FIG. 7 is a diagram showing a coexistence information gathering procedure in a CM of the system for managing resources, and FIG. 8 is a diagram showing a coexistence information gathering procedure in a CDIS of the system for managing resources. That is to say, FIGS. 6 to 8 are diagrams schematically showing message transmission and reception procedures among of the respective objects of the system for managing resources in the coexistence information gathering procedures after the registration procedure in the system for managing resources, for the coexistence and frequency sharing of the plurality of systems, for example, the TVBDs, in the TVWS as described above.

Referring to FIG. 6, in order to gather coexistence information after the registration procedure for the coexistence and frequency sharing of the plurality of systems, for example, the TVBDs, in the TVWS, a CE 604 transmits a TVBD coexistence information request (hereinafter, referred to as 'TVBD_CI_REQ') message which requests coexistence information of a TVBD 602, for example, context information of the TVBD 602, to the TVBD 602 (step 610). Further, the CE 604 receives a TVBD coexistence information response (hereinafter, referred to as 'TVBD_CI_RSP') message including the coexistence information of the TVBD 602, for example, the context information of the TVBD 602, from the TVBD 602 as a response to the TVBD_CI_REQ message (step 612).

The CE 604 transmits a CM coexistence information request (hereinafter, referred to as 'CM_CI_REQ') message which requests coexistence information of a CM corresponding to the CE 604, that is, a CM 606, to the CM 606 (step 614). Here, the CM_CI_REQ message is a message which requests the coexistence information of the CM 606 for gathering coexistence information for the coexistence and frequency sharing of the TVBD 602 in the TVWS as described above. The CM_CI_REQ message is used in the same manner in the centralized topology, the distributed topology and the autonomous mode of the system for managing resources. The contents of the CM_CI_REQ message, that is, the header and payload of the CM_CI_REQ message may be presented as in Table 13. Here, in order for the CDIS to request the coexistence information of the CM 606, the CM_CI_REQ message may be transmitted to the CM 606 by the CDIS.

TABLE 13

| Name | Data Type | Description |
|---|---|---|
| Header | | |
| SourceID | CDIS ID/CE ID | Source identifier |
| DestinationID | CM ID | Destination identifier |
| Payload | | |
| RegisteredCMInformationIDs | COEX_CM_INFO_IDS | Registered CM information IDs Registered CE ID list Registered CE information TVBD type Network type Antenna maximum gain Antenna height Geolocation Service duty cycle Service bandwidth Service coverage Interference range Operating channel list Channelization list TVWS DB channel list Reconfigurable TVWS channel list |

Also, the CE 604 receives a CM coexistence information response (hereinafter, referred to as 'CM_CI_RSP') message including the coexistence information of the CM 606, from the CM 606 as a response to the CM_CI_REQ message (step 616). Here, the CM_CI_RSP message as a response message of the CM_CI_REQ message, which requests the coexistence information of the CM 606 for gathering the coexistence information for the coexistence and frequency sharing of the TVBD 602 in the TVWS as described above, is a message through which the CM 606 notifies the coexistence information of the CM 606 to the CE 604. The CM_CI_RSP message is used in the same manner in the centralized topology, the distributed topology and the autonomous mode of the system for managing resources. The contents of the CM_CI_RSP message, that is, the header and payload of the CM_CI_RSP message may be presented as in Table 14. Here, the CM_CI_RSP message may be transmitted to the CDIS as a response to the request of the coexistence information of the CM 606 by the CDIS as described above.

TABLE 14

| Name | Data Type | Description |
| --- | --- | --- |
| Header | | |
| SourceID | CM ID | Source identifier |
| DestinationID | CDIS ID/CE ID | Destination identifier |
| Payload | | |
| RegisteredCEIDList | SEQUENCE OF STRING | Registered CE ID list |
| The message contents below are repeated for each registered CE | | |
| RegisteredCEID | STRING | Registered CE ID |
| RegisteredCETVBDType | COEX_TVBD_TYPE | TVBD type, categorized by Fixed device type Personal/portable mode I type Personal/portable mode II type |
| RegisteredCENetworkType | COEX_TVBD_NET_TYPE | TVBD network type such as IEEE 802.11af, IEEE 802.22 and IEEE 802.16, etc. |
| RegisteredCEAntennaMaxGain | REAL | TVBD antenna maximum gain |
| RegisteredCEAntennaHeight | REAL | TVBD antenna height |
| RegisteredCEGeolocation | COEX_TVBD_GEOLOCATION | TVBD geolocation, including Latitude Longitude Altitude |
| RegisteredCEDutycycle | REAL | TVBD service duty cycle |
| RegisteredCEBandwidth | REAL | TVBD service bandwidth |
| RegisteredCECoverage | REAL | TVBD service coverage |
| RegisteredCEInterferenceRange | REAL | TVBD interference range |
| RegisteredCEOperatingChList | SEQUENCE OF INTEGER | TVBD operating channel list |
| RegisteredCEChannelizationList | SEQUENCE OF REAL | TVBD channelization list |
| RegisteredCETVWSDBChList | COEX_TVBD_TVWS | TVBD TVWS DB channel list, including Allowed TVWS channel list Channel use constraint |

In this way, as the respective objects transmit and receive messages as described above, the system for managing resources performs the coexistence information gathering procedure in the CE after the registration procedure for the coexistence and frequency sharing of the plurality of systems, for example, the TVBDs. Hereafter, a coexistence information gathering procedure in a CM of the system for managing resources in a communication system in accordance with the exemplary embodiment of the present invention will be described in detail with reference to FIG. 7.

Referring to FIG. 7, in order to gather coexistence information after the registration procedure for the coexistence and frequency sharing of the plurality of systems, for example, the TVBDs, in the TVWS, a CM 704 transmits a CDIS coexistence information request (hereinafter, referred to as 'CDIS_CI_REQ') message which requests coexistence information of neighbor CMs, to a CDIS 706 (step 710). Here, the CDIS_CI_REQ message is a message which requests the coexistence information of the NCMs to the CDIS 706, so as for the CM 604 to discover the NCMs for the purpose of gathering coexistence information for the coexistence and frequency sharing of the TVBD in the TVWS as described above. The CDIS_CI_REQ message is used in the same manner in the centralized topology, the distributed topology and the autonomous mode of the system for managing resources. The contents of the CDIS_CI_REQ message, that is, the header and payload of the CDIS_CI_REQ message may be presented as in Table 15.

TABLE 15

| Name | Data Type | Description |
| --- | --- | --- |
| Header | | |
| SourceID | CM ID | Source identifier |
| DestinationID | CDIS ID | Destination identifier |
| Payload | | |
| NeighborCMIDlist | SEQUENCE OF STRING | Neighbor CM ID list |
| NeighborCMInformationIDs | COEX_CM_INFO_IDS | Neighbor CM information IDs Neighbor CEs information |

The CM 704 receives a CDIS coexistence information response (hereinafter, referred to as 'CDIS_CI_RSP') message including the coexistence information of the NCM, from the CDIS 706 as a response to the CDIS_CI_REQ message (step 712). Here, the CDIS_CI_RSP message as a response message of the CDIS_CI_REQ message, which requests the coexistence information of the NCM for gathering the coexistence information for the coexistence and frequency sharing of the TVBD in the TVWS as described above, is a message through which the CDIS 706 provides the coexistence information of the corresponding NCMs to the CM 704. The CDIS_CI_RSP message is used in the same manner in the centralized topology, the distributed topology and the autonomous mode of the system for managing resources. The contents of the CDIS_CI_RSP message, that is, the header and payload of the CDIS_CI_RSP message may be presented as in Table 16.

TABLE 16

| Name | Data Type | Description |
|---|---|---|
| *Header* | | |
| SourceID | CDIS ID | Source identifier |
| DestinationID | CM ID | Destination identifier |
| *Payload* | | |
| NeighborCMIDList | SEQUENCE OF STRING | Neighbor CM ID list |
| The message contents below are repeated for each neighbor CM | | |
| NeighborCMID | STRING | Neighbor CM ID |
| NeighborCEIDList | SEQUENCE OF STRING | Neighbor CE ID list |
| The message contents below are repeated for each neighbor CE | | |
| NeighborCEID | STRING | Neighbor CE ID |
| NeighborCETVBDType | COEX_TVBD_TYPE | TVBD type, categorized by Fixed device type Personal/portable mode I type Personal/portable mode II type |
| NeighborCENetworkType | COEX_TVBD_NET_TYPE | TVBD network type such as IEEE 802.11af, IEEE 802.22 and IEEE 802.16, etc. |
| NeighborCEAntennaMaxGain | REAL | TVBD antenna maximum gain |
| NeighborCEAntennaHeight | REAL | TVBD antenna height |
| NeighborCEGeolocation | COEX_TVBD_GEOLOCATION | TVBD geolocation, including Latitude Longitude Altitude |
| NeighborCEDutycycle | REAL | TVBD service duty cycle |
| NeighborCEBandwidth | REAL | TVBD service bandwidth |
| NeighborCECoverage | REAL | TVBD service coverage |
| NeighborCEInterferenceRange | REAL | TVBD interference range |
| NeighborCEOperatingChList | SEQUENCE OF INTEGER | TVBD operating channel list |
| NeighborCEChannelizationList | SEQUENCE OF REAL | TVBD channelization list |
| NeighborCETVWSDBChList | COEX_TVBD_TVWS | TVBD TVWS DB channel list, including Allowed TVWS channel list Channel use constraint |

The CM 704 transmits a CE coexistence information request (hereinafter, referred to as 'CE_CI_REQ') message which requests the coexistence information, for example, context information, of a TVBD corresponding to a CE 702, to the CE 702 (step 714). Here, the CE_CI_REQ message is a message which requests the coexistence information of the TVBD, for gathering the coexistence information for the coexistence and frequency sharing of the TVBD in the TVWS as described above. The CE_CI_REQ message is used in the same manner in the centralized topology, the distributed topology and the autonomous mode of the system for managing resources. The contents of the CE_CI_REQ message, that is, the header and payload of the CE_CI_REQ message may be presented as in Table 17.

TABLE 17

| Name | Data Type | Description |
|---|---|---|
| *Header* | | |
| SourceID | CM ID | Source identifier |
| DestinationID | CE ID | Destination identifier |
| *Payload* | | |
| TVBDInformationIDs | COEX_TVBD_INFO_IDS | TVBD information IDs TVBD type TVBD network type TVBD antenna maximum gain TVBD antenna height TVBD geolocation TVBD service duty cycle TVBD service bandwidth TVBD service coverage TVBD interference range TVBD operating channel list |

TABLE 17-continued

| Name | Data Type | Description |
|------|-----------|-------------|
| | | TVBD channelization list<br>TVBD TVWS DB channel list<br>TVBD reconfigurable TVWS channel list |

The CM 704 receives a CE coexistence information response (hereinafter, referred to as 'CE_CI_RSP') message including the coexistence information of the TVBD, for example, the context information of the TVBD, from the CE 702 as a response to the CE_CI_REQ message (step 716). Here, the CE_CI_RSP message as a response message of the CE_CI_REQ message, which requests the coexistence information of the TVBD for gathering coexistence information for the coexistence and frequency sharing of the TVBD in the TVWS as described above, is a message through which the CE 702 provides the coexistence information of the TVBD to the CM 704. The CE_CI_RSP message is used in the same manner in the centralized topology, the distributed topology and the autonomous mode of the system for managing resources. The contents of the CE_CI_RSP message, that is, the header and payload of the CE_CI_RSP message may be presented as in Table 18.

Further, the CM 704 transmits an NCM coexistence information request (hereinafter, referred to as 'NCM_CI_REQ') message which requests coexistence information of an NCM 708, to the NCM 708, on the basis of information for corresponding NCMs, for example, the coexistence information of the NCMs, included in the CDIS_CI_RSP (step 718). Here, the NCM_CI_REQ message is a message which requests the coexistence information of the NCM 708 for gathering coexistence information for coexistence and frequency sharing of the TVBD in the TVWS. The NCM_CI_REQ message is used in the same manner in the centralized topology, the distributed topology and the autonomous mode of the system for managing resources. The contents of the NCM_CI_REQ message, that is, the header and payload of the NCM_CI_REQ message may be presented as in Table 19. Here, in order for one optional CM or MCM to request the coexistence information of corresponding NCMs or SCMs, the NCM_CI_REQ message is transmitted to the NCMs or SCMs.

TABLE 18

| Name | Data Type | Description |
|------|-----------|-------------|
| | Header | |
| SourceID | CE ID | Source identifier |
| DestinationID | CM ID | Destination identifier |
| | Payload | |
| RegisteredCEID | STRING | Registered CE ID |
| RegisteredCETVBDType | COEX_TVBD_TYPE | TVBD type, categorized by<br>Fixed device type<br>Personal/portable mode I type<br>Personal/portable mode II type |
| RegisteredCENetworkType | COEX_TVBD_NET_TYPE | TVBD network type such as IEEE 802.11af, IEEE 802.22 and IEEE 802.16, etc. |
| RegisteredCEAntennaMaxGain | REAL | TVBD antenna maximum gain |
| RegisteredCEAntennaHeight | REAL | TVBD antenna height |
| RegisteredCEGeolocation | COEX_TVBD_GEOLOCATION | TVBD geolocation, including<br>Latitude<br>Longitude<br>Altitude |
| RegisteredCEDutycycle | REAL | TVBD service duty cycle |
| RegisteredCEBandwidth | REAL | TVBD service bandwidth |
| RegisteredCECoverage | REAL | TVBD service coverage |
| RegisteredCEInterferenceRange | REAL | TVBD interference range |
| RegisteredCEOperatingChList | SEQUENCE OF INTEGER | TVBD operating channel list |
| RegisteredCEChannelizationList | SEQUENCE OF REAL | TVBD channelization list |
| RegisteredCETVWSDBChList | COEX_TVBD_TVWS | TVBD TVWS DB channel list, including<br>Allowed TVWS channel list<br>Channel use constraint |

TABLE 19

| Name | Data Type | Description |
|---|---|---|
| Header | | |
| SourceID | CM ID/Master CM ID | Source identifier |
| DestinationID | Neighbor CM ID/Slave CM ID | Destination identifier |
| Payload | | |
| NeighborCEIDList | SEQUENCE OF STRING | Neighbor CE ID list to collect context information |
| NeighborCEInformationIDs | COEX_TVBD_INFO_IDS | Neighbor CEs information<br>TVBD type<br>TVBD network type<br>TVBD antenna maximum gain<br>TVBD antenna height<br>TVBD geolocation<br>TVBD service duty cycle<br>TVBD service bandwidth<br>TVBD service coverage<br>TVBD interference range<br>TVBD operating channel list<br>TVBD channelization list<br>TVBD TVWS DB channel list<br>TVBD reconfigurable TVWS channel list |

The CM 704 receives an NCM coexistence information response (hereinafter, referred to as 'NCM_CI_RSP') message including the coexistence information of the NCM 708, from the NCM 708 as a response to the NCM_CI_REQ message (step 720). Here, the NCM_CI_RSP message as a response message of the NCM_CI_REQ message, which requests the coexistence information of the NCM 708 for gathering coexistence information for coexistence and frequency sharing of the TVBD in the TVWS as described above, is a message through which the NOM 708 provides the coexistence information of the NCM 708 to the CM 704. The NCM_CI_RSP message is used in the same manner in the centralized topology, the distributed topology and the autonomous mode of the system for managing resources. The contents of the NCM_CI_RSP message, that is, the header and payload of the NCM_CI_RSP message may be presented as in Table 20. Here, the NCM_CI_RSP message is a message which provides the coexistence information of the corresponding NCMs or SCMs to the optional CM or MCM, as a response to the request of the coexistence information of the corresponding NCMs or SCMs by the optional CM or MCM.

TABLE 20

| Name | Data Type | Description |
|---|---|---|
| Header | | |
| SourceID | Neighbor CM ID/Slave CM ID | Source identifier |
| DestinationID | CM ID/Master CM ID | Destination identifier |
| Payload | | |
| NeighborCEIDList | SEQUENCE OF STRING | Neighbor CE ID list |
| The message contents below are repeated for each neighbor CE | | |
| NeighborCEID | STRING | Neighbor CE ID |
| NeighborCETVBDType | COEX_TVBD_TYPE | TVBD type, categorized by Fixed device type<br>Personal/portable mode I type<br>Personal/portable mode II type |
| NeighborCENetworkType | COEX_TVBD_NET_TYPE | TVBD network type such as IEEE 802.11af, IEEE 802.22 and IEEE 802.16, etc. |
| NeighborCEAntennaMaxGain | REAL | TVBD antenna maximum gain |
| NeighborCEAntennaHeight | REAL | TVBD antenna height |
| NeighborCEGeolocation | COEX_TVBD_GEOLOCATION | TVBD geolocation, including Latitude<br>Longitude<br>Altitude |
| NeighborCEDutycycle | REAL | TVBD service duty cycle |
| NeighborCEBandwidth | REAL | TVBD service bandwidth |
| NeighborCECoverage | REAL | TVBD service coverage |
| NeighborCEInterferenceRange | REAL | TVBD interference range |
| NeighborCEOperatingChList | SEQUENCE OF INTEGER | TVBD operating channel list |

TABLE 20-continued

| Name | Data Type | Description |
| --- | --- | --- |
| NeighborCEChannelizationList | SEQUENCE OF REAL | TVBD channelization list |
| NeighborCETVWSDBChList | COEX_TVBD_TVWS | TVBD TVWS DB channel list, including<br>Allowed TVWS channel list<br>Channel use constraint |

In this way, as the respective objects transmit and receive messages as described above, the system for managing resources performs the coexistence information gathering procedure in the CM after the registration procedure for the coexistence and frequency sharing of the plurality of systems, for example, the TVBDs. Hereafter, a coexistence information gathering procedure in a CDIS of the system for managing resources in a communication system in accordance with the exemplary embodiment of the present invention will be described in detail with reference to FIG. 8.

Referring to FIG. 8, in order to gather coexistence information after the registration procedure for the coexistence and frequency sharing of the plurality of systems, for example, the TVBDs, in the TVWS, a CDIS 804 transmits a CM_CI_REQ message which requests coexistence information of a CM 802, to the CM 802 (step 810). Here, the CM_CI_REQ message is a message which requests the coexistence information of the CM 802 to gather coexistence information for the coexistence and frequency sharing of the TVBDs in the TVWS as described above. The CM_CI_REQ message is used in the same manner in the centralized topology, the distributed topology and the autonomous mode of the system for managing resources. The contents of the CM_CI_REQ message, that is, the header and payload of the CM_CI_REQ message are as given in Table 13.

The CDIS 804 receives a CM_CI_RSP message including the coexistence information of the CM 802, from the CM 802 as a response to the CM_CI_REQ message (step 812). Here, the CM_CI_RSP message as a response message of the CM_CI_REQ message, which requests the coexistence information of the CM 802 to gather coexistence information for the coexistence and frequency sharing of the TVBDs in the TVWS as described above, is a message through which the CM 802 provides the coexistence information of the CM 802 to the CDIS 804. The CM_CI_RSP message is used in the same manner in the centralized topology, the distributed topology and the autonomous mode of the system for managing resources. The contents of the CM_CI_RSP message, that is, the header and payload of the CM_CI_RSP message are as given in Table 14.

In this way, as the respective objects, in particular, the CE, the CM and the CDIS, transmit and receive messages as described above, the system for managing resources performs the coexistence information gathering procedure for the coexistence and frequency sharing of the plurality of systems, for example, the TVBDs. Hereafter, a coexistence decision making procedure of the system for managing resources in a communication system in accordance with the exemplary embodiment of the present invention will be described in detail with reference to FIGS. 9 to 14.

Figure 9:
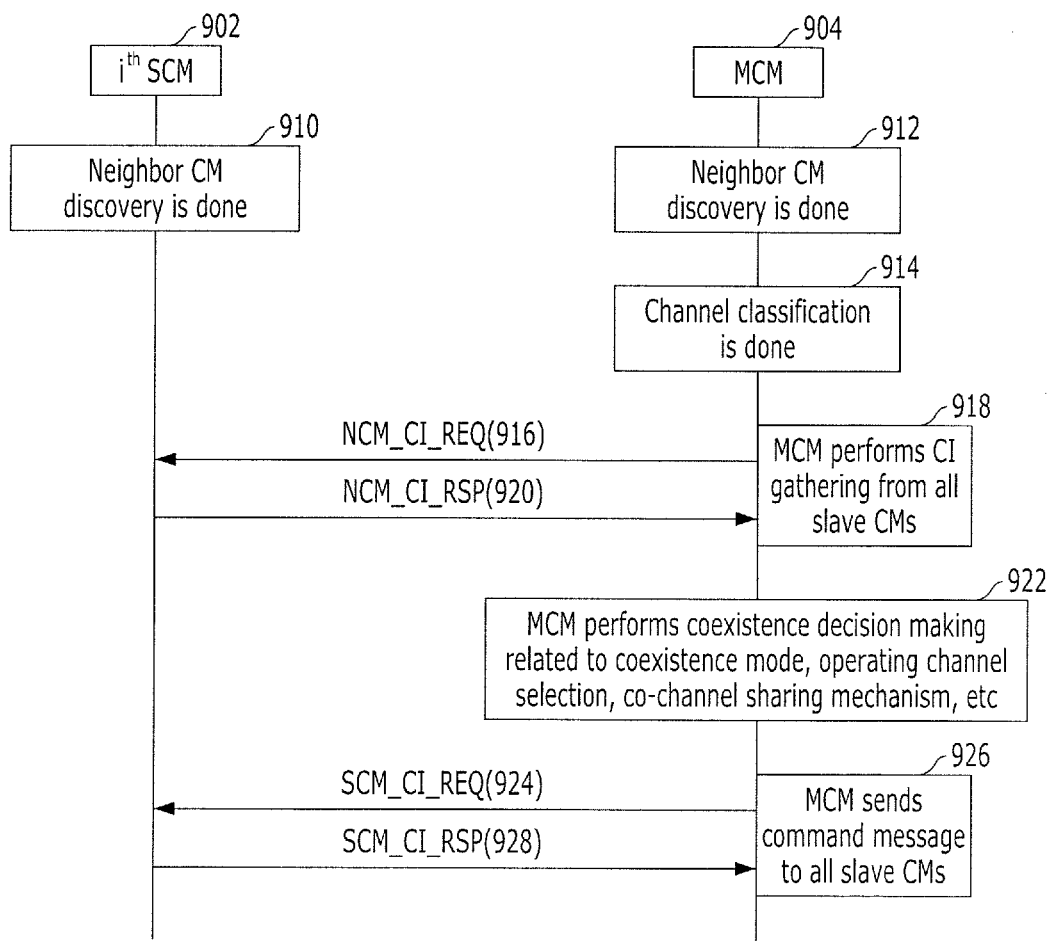
FIGS. 9 to 14 are diagrams schematically showing coexistence decision making procedures of the system for managing resources in a communication system in accordance with the exemplary embodiment of the present invention.
Figure 10:
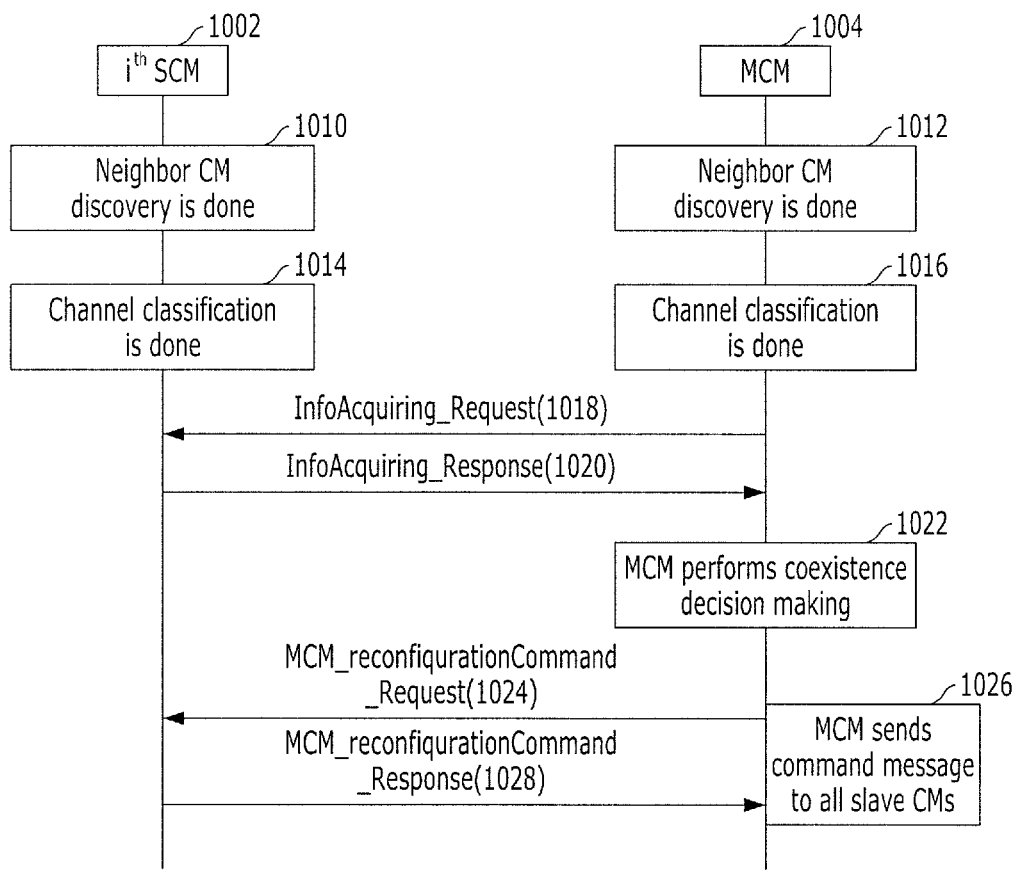
Figure 11:
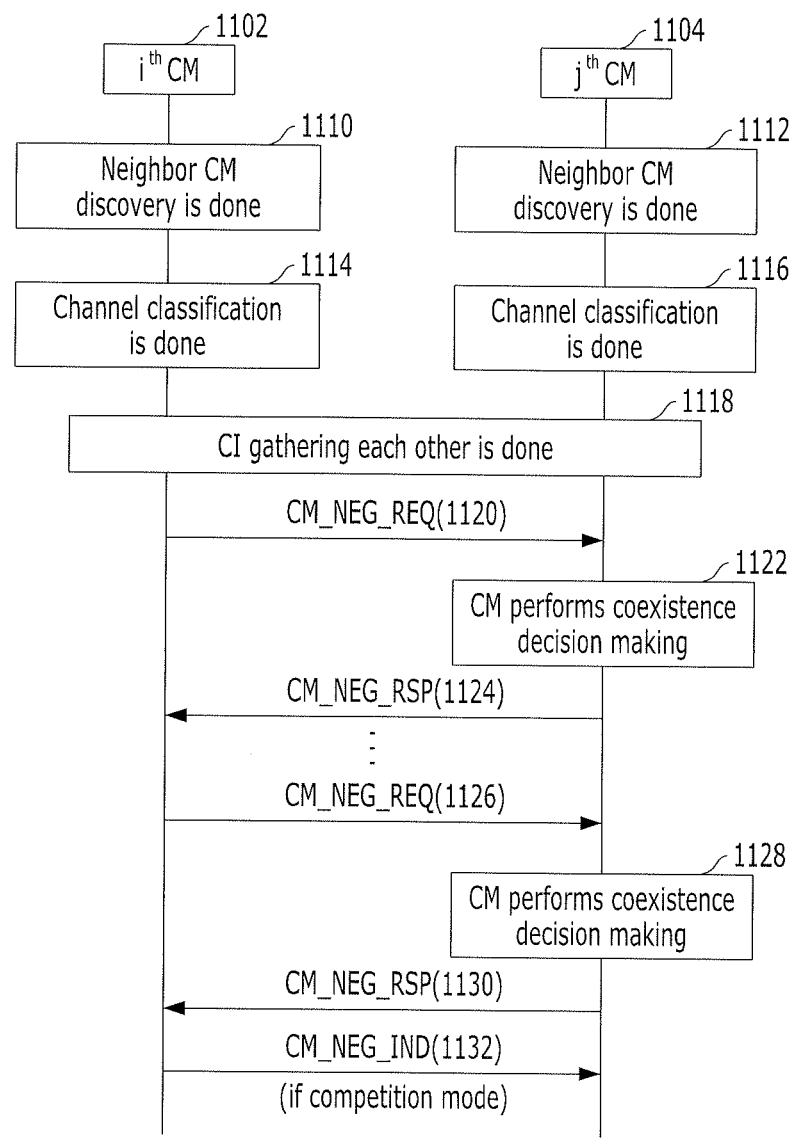
Figure 12:
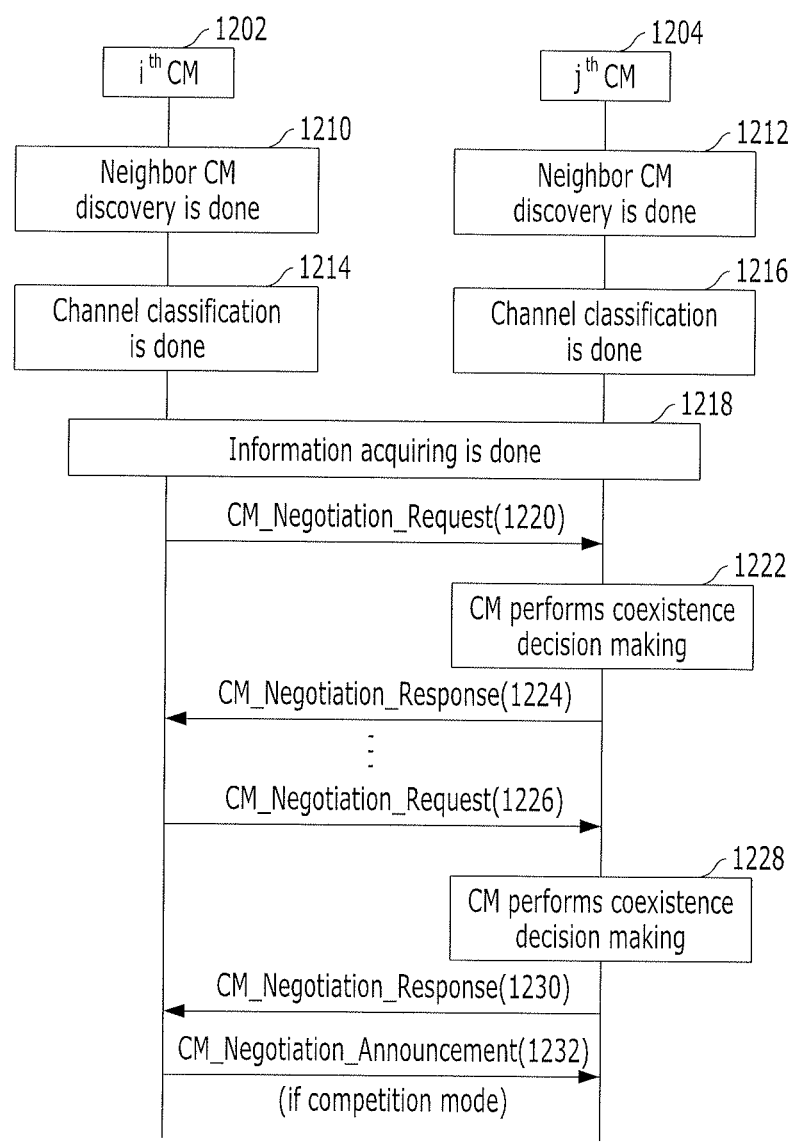
Figure 13:
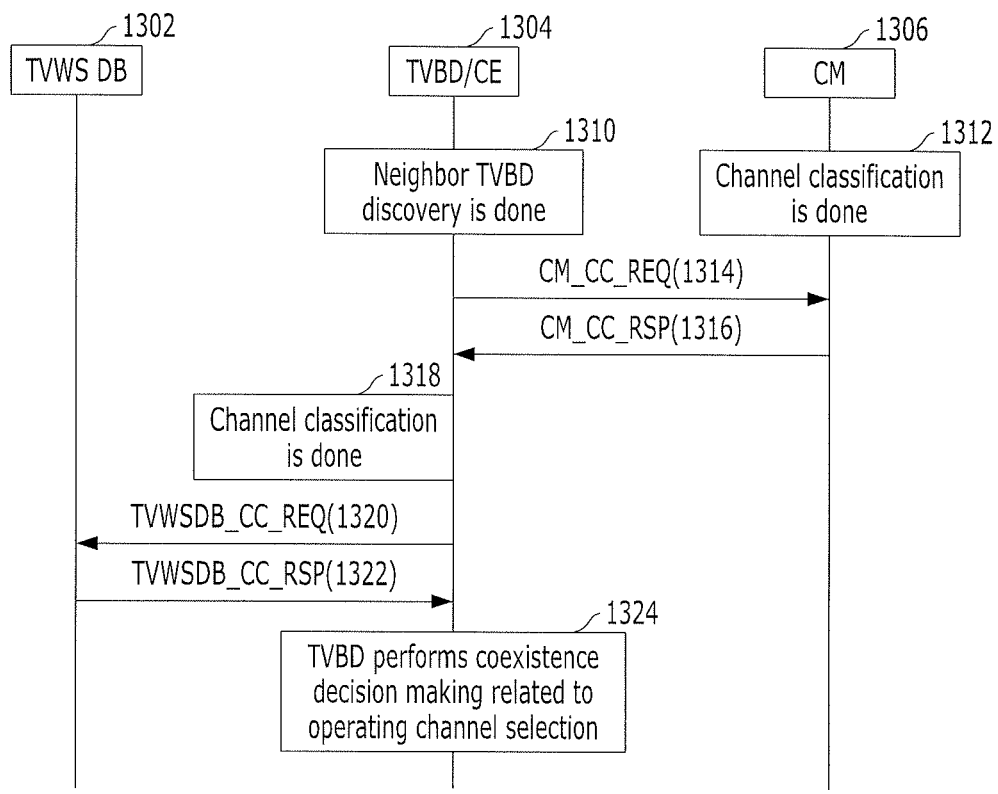
Figure 14:
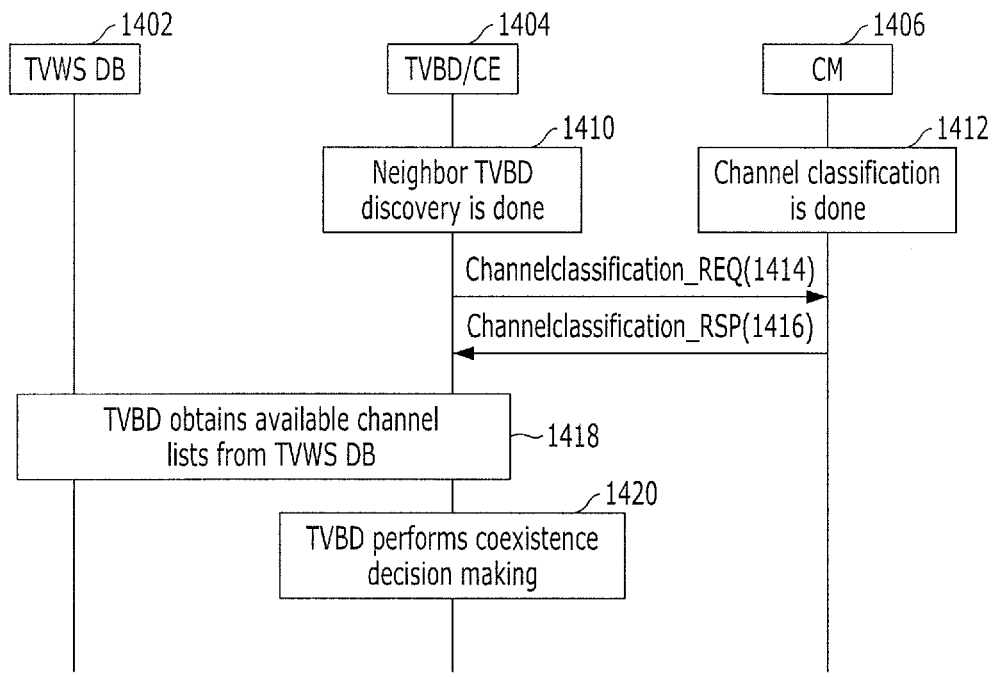

FIGS. 9 to 14 are diagrams schematically showing coexistence decision making procedures of the system for managing resources in a communication system in accordance with the exemplary embodiment of the present invention. FIGS. 9 and 10 are diagrams showing coexistence decision making procedures in an MCM of the system for managing resources in the centralized topology, FIGS. 11 and 12 are diagrams showing coexistence decision making procedures in an optional CM of the system for managing resources in the distributed topology, and FIGS. 13 and 14 are diagrams showing coexistence decision making procedures in a CE of the system for managing resources in the autonomous mode. That is to say, FIGS. 9 to 14 are diagrams schematically showing message transmission and reception procedures among the respective objects of the system for managing resources in the coexistence decision making procedures, after the registration procedure and the coexistence information gathering procedure in the system for managing resources, for the coexistence and frequency sharing of the plurality of systems, for example, the TVBDs, in the TVWS as described above.

Referring to FIG. 9, in order for coexistence decision making after the registration procedure and the coexistence information gathering procedure for the coexistence and frequency sharing of the plurality of systems, for example, the TVBDs, in the TVWS, in the centralized topology, an optional $i^{th}$ SCM 902 among a plurality of CMs and an MCM 904 complete discovery of NCMs corresponding to them (step 910 and step 912).

After completing channel classification in the TVWS (step 914), the MCM 904 transmits an NCM_CI_REQ message which requests coexistence information of the NCM corresponding to the $i^{th}$ SCM 902, to the $i^{th}$ SCM 902 (step 916). The MCM 904 gathers coexistence information from all SCMs corresponding to the MCM 904 (step 918). The MCM 904 receives an NCM_CI_RSP message including the coexistence information of the NCM of the $i^{th}$ SCM 902, as a response to the NCM_CI_REQ message (step 920).

Then, the MCM 904 performs coexistence decision making on the basis of the coexistence information of the SCMs acquired through the coexistence information gathering, for example, information regarding coexistence mode, operating channel selection, co-channel sharing mechanism, etc. (step 922).

Next, the MCM 904 transmits an SCM command request (hereinafter, referred to as 'SCM_CMD_REQ') message which requests a reconfiguration command of a corresponding SCM among the SCMs, to the $i^{th}$ SCM 902 (step 924). At this time, the MCM 904 transmits the SCM_COM_REQ message to all SCMs corresponding to itself (step 926). Here, the SCM_COM_REQ message is a message which requests reconfiguration commands of corresponding SCMs to the corresponding SCMs in correspondence to the coexistence decision making in the MCM 904, and is transmitted to all SCMs by the MCM 904. The SCM_COM_REQ message is used in the centralized topology of the system for managing resources. The contents of the SCM_COM_REQ message, that is, the header and payload of the SCM_COM_REQ message may be presented as in Table 21.

TABLE 21

| Name | Data Type | Description |
| --- | --- | --- |
| Header | | |
| SourceID | Master CM ID | Source identifier |
| DestinationID | Slave CM ID | Destination identifier |
| Payload | | |
| RegisteredCEIDList | SEQUENCE OF STRING | Registered CE ID list included in corresponding slave CM |
| The message contents below are repeated for each registered CE | | |
| RegisteredCEID | STRING | Registered CE ID included in corresponding slave CM |
| CoexistenceMode | COEX_MODE | Coexistence mode such as Individual channel assignment mode Co-channel sharing mode |
| ChannelClassificationList | COEX_CH_CLASSIFICATION | Channel classification list such as Available channel list Restricted channel list Operating channel list |
| ServiceSchedule | COEX_SER_SCHEDULE | Service scheduling, including TBD |

Further, the MCM 904 receives an SCM command response (hereinafter, referred to as 'SCM_CMD_RSP') message including the reconfiguration command of the corresponding SCM among all SCMs, from the $i^{th}$ SCM 902 as a response to the SCM_COM_REQ message (step 928). Here, the SCM_CMD_RSP message as a response message of the SCM_COM_REQ message, which requests the reconfiguration command of the SCM for coexistence decision making for the coexistence and frequency sharing of the TVBD in the TVWS as described above, is a message through which each of all SCMs transmits to the MCM 904 as a response to the reconfiguration of the corresponding SCM. The SCM_CMD_RSP message is used in the centralized topology of the system for managing resources. The contents of the SCM_CMD_RSP message, that is, the header and payload of the SCM_CMD_RSP message may be presented as in Table 22.

TABLE 22

| Name | Data Type | Description |
| --- | --- | --- |
| Header | | |
| SourceID | Slave CM ID | Source identifier |
| DestinationID | Master CM ID | Destination identifier |
| Payload | | |
| RegisteredCEIDList | SEQUENCE OF STRING | Registered CE ID list included in corresponding slave CM |
| The message contents below are repeated for each registered CE | | |
| RegisteredCEID | STRING | Registered CE ID in corresponding slave CM |
| ReconfigurationParameters | COEX_RC_PARAMETERS | The status information of reconfiguration parameters is provided with accepted values of parameters when reconfiguration is succeed recommended values of parameters when reconfiguration is failed |

Also, referring to FIG. 10, in order for coexistence decision making after the registration procedure and the coexistence information gathering procedure for the coexistence and frequency sharing of the plurality of systems, for example, the TVBDs, in the TVWS, in the centralized topology, an optional $i^{th}$ SCM 1002 among a plurality of CMs and an MCM 1004 complete discovery of NCMs corresponding to them (step 1010 and step 1012).

After the $i^{th}$ SCM 1002 and the MCM 1004 complete channel classification in the TVWS (step 1014 and step 1016), the MCM 1004 transmits an information acquiring request (hereinafter, referred to as 'InfoAcquiring_Request') message for acquiring information of the $i^{th}$ SCM 1002, to the $i^{th}$ SCM 1002 (step 1018). The MCM 1004 receives an information acquiring response (hereinafter, referred to as 'InfoAcquiring_Response') message including the information of the $i^{th}$ SCM 1002, from the $i^{th}$ SCM 1002 as a response to the InfoAcquiring_Request message (step 1020).

The MCM 1004 performs coexistence decision making on the basis of the information of the $i^{th}$ SCM 1002 included in the InfoAcquiring_Response message, for example, information regarding coexistence mode, operating channel selection, co-channel sharing mechanism, etc. (step 1022).

Next, the MCM 1004 transmits an SCM reconfiguration command request (hereinafter, referred to as 'SCM_ReconfigurationCommand_Request') message which requests the reconfiguration command of the SCM, to the $i^{th}$ SCM 1002 (step 1024). At this time, the MCM 1004 transmits the SCM_ReconfigurationCommand_Request message to all SCMs corresponding to itself (step 1026). Here, the SCM_ReconfigurationCommand_Request message is a message which requests the reconfiguration commands of corresponding SCMs to all SCMs in correspondence to the coexistence decision making in the MCM 1004, and is transmitted to all SCMs by the MCM 1004. The SCM_ReconfigurationCommand_Request message is used in the centralized topology of the system for managing resources. The contents of the SCM_ReconfigurationCommand_Request message, that is, the header and payload of the SCM_ReconfigurationCommand_Request message may be presented as in Table 23.

TABLE 23

| Information element | Data type | Description |
|---|---|---|
| Header | | |
| sourceIdentifier = CM_ID | CX_ID | Source identifier |
| destinationIdentifier = CE_ID | CX_ID | Destination identifier |
| ACKPolicy | BOOLEAN | Request to send an acknowledgement of reception |
| Payload | | |
| Note: Information elements below are repeated for each TVBD network or device. | | |
| reconfigurationRequest | ReconfigurationRequest | Reconfiguration request description |
| chClassInfo | ChClassInfo | Channel classification information of the CE |
| timeSharingUnitInfo | TimeSharingUnitInfo | General time sharing unit information |

Further, the MCM 1004 receives an SCM reconfiguration command response (hereinafter, referred to as 'SCM_ReconfigurationCommand_Response') message which provides the reconfiguration command of the corresponding SCM among all SCMs, from the $i^{th}$ SCM 1002 as a response to the SCM_ReconfigurationCommand_Request message (step 1028). Here, the SCM_ReconfigurationCommand_Response message as a response message of the SCM_ReconfigurationCommand_Request message which requests the reconfiguration command of the SCM for the coexistence decision making for the coexistence and frequency sharing of the TVBD in the TVWS as described above, is a message through which each of all SCMs transmits the reconfiguration command of the corresponding SCM to the MCM 1004. The SCM_ReconfigurationCommand_Response message is used in the centralized topology of the system for managing resources. The contents of the SCM_ReconfigurationCommand_Response message, that is, the header and payload of the SCM_ReconfigurationCommand_Response message may be presented as in Table 24.

TABLE 24

| Information element | Data type | Description |
|---|---|---|
| Header | | |
| sourceIdentifier = CE_ID | CX_ID | Source identifier |
| destinationIdentifier = CM_ID | CX_ID | Destination identifier |
| ACKPolicy | BOOLEAN | Request to send an acknowledgement of reception |
| Payload | | |
| Status | BOOLEAN | Status: successful or not |
| failedParameters | FailedParameters | Failed reconfiguration parameters with recommended values of parameters if reconfiguration request from slave CM to TVBD is failed |

In this way, as the respective objects, in particular, the MCM and the SCM, transmit and receive messages in the centralized topology as described above, the system for managing resources performs the coexistence decision making procedure for the coexistence and frequency sharing of the plurality of systems, for example, the TVBDs. Hereafter, a coexistence decision making procedure in the distributed topology of the system for managing resources in a communication system in accordance with the exemplary embodiment of the present invention will be described in detail with reference to FIGS. 11 and 12.

Referring to FIG. 11, in order for coexistence decision making after the registration procedure and the coexistence information gathering procedure for the coexistence and frequency sharing of the plurality of systems, for example, the TVBDs, in the TVWS, in the distributed topology, an optional $i^{th}$ CM 1102 and an optional $j^{th}$ CM 1104 among a plurality of CMs complete discovery of NCMs corresponding to them (step 1110 and step 1112).

After completing channel classification in the TVWS (step 1114 and step 1116), the $i^{th}$ CM 1102 and the $j^{th}$ CM 1104 complete the coexistence information gathering as described above (step 1118). Since the coexistence information gathering procedure in the CM has been described in detail with reference to FIG. 7, detailed description thereof will be omitted herein.

Then, the $j^{th}$ CM 1104 receives a CM negotiation request (hereinafter, referred to as 'CM-NEG_REQ') message which includes negotiation information of a CM neighboring to the $j^{th}$ CM 1104 itself, for example, the $i^{th}$ CM 1102, from the $i^{th}$ CM 1102 (step 1120). Here, the CM_NEG_REQ message is a message which is transmitted to an NCM to provide the negotiation information to the NCM when an optional CM, for example, the $i^{th}$ CM 1102, is in a neighboring relationship with respect to another CM, for example, the $j^{th}$ CM 1104. The $i^{th}$ CM 1102 transmits the CM_NEG_REQ message including the negotiation information to the $j^{th}$ CM 1104 as the NCM. The CM_NEG_REQ message is used in the same manner in the distributed topology of the system for managing resources. The contents of the CM_NEG_REQ message, that is, the header and payload of the CM_NEG_REQ message may be presented as in Table 25.

TABLE 25

| Name | Data Type | Description |
| --- | --- | --- |
| Header | | |
| SourceID | CM ID | Source identifier |
| DestinationID | Neighbor CM ID | Destination identifier |
| Payload | | |
| DialogToken | INTEGER | Identification of transaction |
| NeogtiationStatus | NEG_STATUS | Negotiation status |
| NegotiationInformation | NEG_INFO | Specific information Mode (Etiquette/Contention) Channel list General time sharing information Round-robin mode information Competition mode information |

The $j^{th}$ CM 1104 performs coexistence decision making on the basis of the negotiation information included in the CM_NEG_REQ message and the coexistence information acquired through the coexistence information gathering procedure, for example, the information regarding coexistence mode, operating channel selection, co-channel sharing mechanism, etc. (step 1122).

Next, the $j^{th}$ CM 1104 transmits a CM negotiation response (hereinafter, referred to as 'CM_NEG_RSP') message including the negotiation information of the $j^{th}$ CM 1104 itself, to the $i^{th}$ CM 1102 as a response to the CM_NEG_REQ message (step 1124). Here, the CM_NEG_RSP is a message which is transmitted to an NCM to provide the negotiation information to the NCM when an optional CM, for example, the $j^{th}$ CM 1104, is in a neighboring relationship with respect to another CM, for example, the $i^{th}$ CM 1102. The $j^{th}$ CM 1104 transmits the CM_NEG_RSP message including the negotiation information to the $i^{th}$ CM 1102 as the NCM. The CM_NEG_RSP message is used in the distributed topology of the system for managing resources. The contents of the CM_NEG_RSP message, that is, the header and payload of the CM_NEG_RSP message may be presented as in Table 26.

TABLE 26

| Name | Data Type | Description |
| --- | --- | --- |
| Header | | |
| SourceID | CM ID | Source identifier |
| DestinationID | Neighbor CM ID | Destination identifier |
| Payload | | |
| DialogToken | INTEGER | Identification of transaction |
| NeogtiationStatus | NEG_STATUS | Negotiation status |
| NegotiationInformation | NEG_INEO | Specific information Mode (Etiquette/Contention) Channel list General time sharing information Round-robin mode information Competition mode information |

The transmission and reception of the CM_NEG_REQ message (step 1126) and the transmission and reception of the CM_NEG_RSP message (step 1130) between the $i^{th}$ CM 1102 and $j^{th}$ CM 1104 and the coexistence decision making after the $j^{th}$ CM 1104 receives the CM_NEG_REQ message (step 1128) are repeatedly performed.

When NCMs of the $j^{th}$ CM 1104 are in a competition mode, the $i^{th}$ CM 1102 transmits a CM negotiation indication (hereinafter, referred to as 'CM_NEG_IND') message which indicates completion of negotiation, to the NCMs, for example, the $j^{th}$ CM 1104 (step 1132). Here, the CM_NEG_IND message is a message which is transmitted to an NCM to provide the negotiation information to the NCM when an optional CM, for example, the $i^{th}$ CM 1102 is in a neighboring relationship with respect to another CM, for example, the $j^{th}$ CM 1104. The $i^{th}$ CM 1102 provides the negotiation information to the $j^{th}$ CM 1104 as the NCM. The CM_NEG_IND message is used in the distributed topology of the system for managing resources. The contents of the CM_NEG_IND message, that is, the header and payload of the CM_NEG_IND message may be presented as in Table 27.

TABLE 27

| Name | Data Type | Description |
| --- | --- | --- |
| Header | | |
| SourceID | CM ID | Source identifier |
| DestinationID | Neighbor CM ID | Destination identifier |
| Payload | | |
| DialogToken | INTEGER | Identification of transaction |
| WinnderCMDIList | SEQUENCE OF CM ID | CM ID list |
| SlotTimePositionList | SEQUENCE OF REAL | Slot time position list |

Also, referring to FIG. 12, in order for coexistence decision making after the registration procedure and the coexistence information gathering procedure for the coexistence and frequency sharing of the plurality of systems, for example, the TVBDs, in the TVWS, in the distributed topology, an optional $i^{th}$ CM 1202 and an optional $j^{th}$ CM 1204 among a plurality of CMs complete discovery of NCMs corresponding to them (step 1210 and step 1212).

After completing channel classification in the TVWS (step 1214 and step 1216), the $i^{th}$ CM 1202 and the $j^{th}$ CM 1204 complete gathering of information of NCMs (step 1218).

Then, the $j^{th}$ CM 1204 receives a CM negotiation request (hereinafter, referred to as 'CM_Negotiation_Request') message which includes negotiation information of a CM neighboring to the $j^{th}$ CM 1204, for example, the $i^{th}$ CM 1202, from the $i^{th}$ CM 1202 (step 1220). Here, the CM_Negotiation_Request message is a message which is transmitted to an NCM to provide negotiation information to the NCM when an optional CM, for example, the $i^{th}$ CM 1202, is in a neighboring relationship with respect to another CM, for example, the $j^{th}$ CM 1204. The $i^{th}$ CM 1202 transmits the CM_Negotiation_Request message including the negotiation information to the $j^{th}$ CM 1204 as the NCM. The CM_Negotiation_Request message is used in the distributed topology of the system for managing resources. The contents of the CM_Negotiation_Request message, that is, the header and payload of the CM_Negotiation_Request message may be presented as in Table 28.

TABLE 28

| Information element | Data type | Description |
| --- | --- | --- |
| Header | | |
| sourceIdentifier = CM_ID | CX_ID | Source identifier |
| destinationIdentifier = CM_ID | CX_ID | Destination identifier |
| ACKPolicy | BOOLEAN | Request to send an acknowledgement of reception |
| Payload | | |
| dialogToken | INTEGER | Identification of transaction |
| negotiationStatus | NegotiationStatus | Negotiation status |
| negotiationInformation | NegotiationInformation | Negotiation information |

The $j^{th}$ CM 1204 performs coexistence decision making on the basis of the negotiation information included in the CM_Negotiation_Request message and the acquired information of the NCM, for example, the information regarding coexistence mode, operating channel selection, co-channel sharing mechanism, etc. (step 1222).

Next, the $j^{th}$ CM 1204 transmits a CM negotiation response (hereinafter, referred to as 'CM_Negotiation_Response') message including the negotiation information of the $j^{th}$ CM 1204 itself, to the $i^{th}$ CM 1202 as a response to the CM_Negotiation_Request message (step 1224). Here, the CM_Negotiation_Response message is a message which is transmitted to an NCM to provide negotiation information to the NCM when an optional CM, for example, the $j^{th}$ CM 1204, is in a neighboring relationship with respect to another CM, for example, the $i^{th}$ CM 1202. The $j^{th}$ CM 1204 transmits the CM_Negotiation_Response message including the negotiation information to the $i^{th}$ CM 1202 as the NCM. The CM_Negotiation_Response message is used in the distributed topology of the system for managing resources. The contents of the CM_Negotiation_Response message, that is, the header and payload of the CM_Negotiation_Response message may be presented as in Table 29.

TABLE 29

| Information element | Data type | Description |
| --- | --- | --- |
| Header | | |
| sourceIdentifier = CM_ID | CX_ID | Source identifier |
| destinationIdentifier = CM_ID | CX_ID | Destination identifier |
| ACKPolicy | BOOLEAN | Request to send an acknowledgement of reception |
| Payload | | |
| dialogToken | INTEGER | Identification of transaction |
| negotiationStatus | NegotiationStatus | Negotiation status |
| negotiationInformation | NegotiationInformation | Negotiation information |

The transmission and reception of the CM_Negotiation_Request message (step 1226) and the transmission and reception of the CM_Negotiation_Response message (step 1230) between the $i^{th}$ CM 1202 and $j^{th}$ CM 1204 and the coexistence decision making after the $j^{th}$ CM 1204 receives the CM_Negotiation_Request message (step 1228) are repeatedly performed.

When NCMs of the $j^{th}$ CM 1204 are in a competition mode, the $i^{th}$ CM 1202 transmits a CM negotiation announcement (hereinafter, referred to as 'CM_Negotiation_Announcement') message which announces completion of negotiation, to the NCMs, for example, the $j^{th}$ CM 1204 (step 1232). Here, the CM_Negotiation_Announcement message is a message which is transmitted to an NCM to provide negotiation information to the NCM when an optional CM, for example, the $i^{th}$ CM 1202 is in a neighboring relationship with respect to another CM, for example, the $j^{th}$ CM 1204. The $i^{th}$ CM 1202 provides the negotiation information to the $j^{th}$ CM 1204 as the NCM. The CM_Negotiation_Announcement message is used in the distributed topology of the system for managing resources. The contents of the CM_Negotiation_Announcement message, that is, the header and payload of the CM_Negotiation_Announcement message may be presented as in Table 30.

TABLE 30

| Information element | Data type | Description |
| --- | --- | --- |
| Header | | |
| sourceIdentifier = CM_ID | CX_ID | Source identifier |
| destinationIdentifier = CM_ID | CX_ID | Destination identifier |
| ACKPolicy | BOOLEAN | Request to send an acknowledgement of reception |
| Payload | | |
| dialogToken | INTEGER | Identification of transaction |
| listOfWinnerCMID | ListOfWinnerCMID | Winner CM ID list |
| listOfSlotTimePosition | ListOfSlotTimePosition | Slot time position list |

In this way, as the respective objects, in particular, the optional CM and the NCM, transmit and receive messages in the distributed topology as described above, the system for managing resources performs the coexistence decision making procedure for the coexistence and frequency sharing of the plurality of systems, for example, the TVBDs. Hereafter, a coexistence decision making procedure in the autonomous mode of the system for managing resources in a communication system in accordance with the exemplary embodiment of the present invention will be described in detail with reference to FIGS. 13 and 14.

Referring to FIG. 13, in order for coexistence decision making after the registration procedure and the coexistence information gathering procedure for the coexistence and frequency sharing of the plurality of systems, for example, the TVBDs, in the TVWS, in the autonomous mode, a TVBD and CE (hereinafter, referred to as 'TVBD/CE') 1304 completes discovery of neighbor TVBDs (step 1310), and a CM 1306 completes channel classification in the TVWS (step 1312).

The TVBD/CE 1304 transmits a CM channel classification request (hereinafter, referred to as 'CM_CC_REQ') message which requests information of the channel classification of the CM 1306, to the CM 1306 (step 1314), and receives a CM channel classification response (hereinafter, referred to as 'CM_CC_RSP') message including the channel classification information of the CM 1306, from the CM 1306 as a response to the CM_CC_REQ message (step 1316). The TVBD/CE 1304 completes the channel classification in the TVWS through the channel classification information included in the CM_CC_RSP message (step 1318).

Next, the TVBD/CE 1304 transmits a TVWS DB channel classification request (hereinafter, referred to as 'TVWSDB_CC_REQ') message which requests channel classification information of a TVWS DB 1302, to the TVWS DB 1302 (step 1320), and receives a TVWS channel classification response (hereinafter, referred to as 'TVWSDB_CC_RSP') message which includes the channel classification information of the TVWS DB 1302, from the TVWS DB 1302 as a response to the TVWSDB_CC_REQ message (step 1322).

Then, the TVBD/CE 1304 performs coexistence decision making on the basis of operation channel selection corresponding to the received channel information (step 1324).

Referring to FIG. 14, in order for coexistence decision making after the registration procedure and the coexistence information gathering procedure for the coexistence and frequency sharing of the plurality of systems, for example, the TVBDs, in the TVWS, in the autonomous mode, a TVBD/CE 1304 completes discovery of neighbor TVBDs (step 1410), and a CM 1406 completes channel classification in the TVWS (step 1412).

The TVBD/CE 1304 transmits a channel classification request (hereinafter, referred to as 'ChannelClassification_Request') message which requests information of the channel classification of the CM 1406, to the CM 1406 (step 1414), and receives a channel classification response (hereinafter, referred to as 'ChannelClassification_Response') message including the channel classification information of the CM 1406, from the CM 1406 as a response to the ChannelClassification_Request message (step 1416).

Then, the TVBD/CE 1404 obtains available channel lists from the TVWS DB 1402 (step 1418), and performs coexistence decision making on the basis of operating channel selection corresponding to the channel classification information of the CM 1406 and the available channel lists (step 1420).

In this way, as the respective objects, in particular, the TVBD and the CE, transmit and receive messages in the autonomous mode as described above, the system for managing resources performs the coexistence decision making procedure for the coexistence and frequency sharing of the plurality of systems, for example, the TVBDs. Hereafter, a reconfiguration procedure of the system for managing resources in a communication system in accordance with the exemplary embodiment of the present invention will be described in detail with reference to FIGS. 15 and 16.

Figure 15:
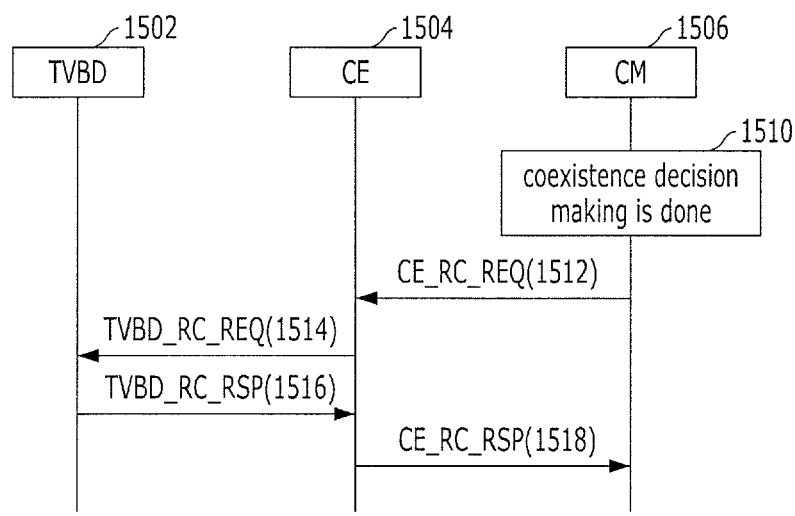
FIGS. 15 and 16 are diagrams schematically showing reconfiguration procedures of the system for managing resources in a communication system in accordance with the exemplary embodiment of the present invention.
Figure 16:
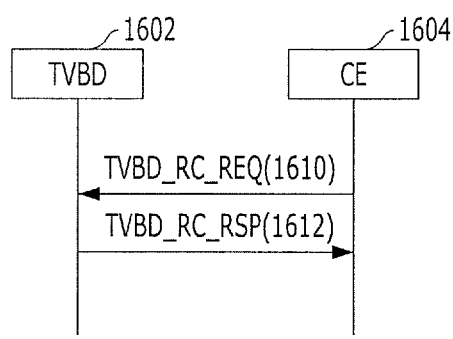

FIGS. 15 and 16 are diagrams schematically showing reconfiguration procedures of the system for managing resources in a communication system in accordance with the exemplary embodiment of the present invention. FIG. 15 is a diagram showing a reconfiguration procedure in a CM of the system for managing resources in a management mode, and FIG. 16 is a diagram showing a reconfiguration procedure in a CE of the system for managing resources in an autonomous mode. Namely, FIGS. 15 and 16 are diagrams schematically showing message transmission and reception procedures among the respective objects of the system for managing resources in the reconfiguration procedures, after the registration procedure, the coexistence information gathering procedure and the coexistence decision making procedure in the system for managing resources, for the coexistence and frequency sharing of the plurality of systems, for example, the TVBDs, in the TVWS as described above.

Referring to FIG. 15, in order for reconfiguration after the registration procedure, the coexistence information gathering procedure and the coexistence decision making procedure for the coexistence and frequency sharing of the plurality of systems, for example, the TVBDs, in the TVWS, in the management mode, after a CM 1506 completes the coexistence decision making as described above (step 1510), the CM 1506 transmits a CE reconfiguration request (hereinafter, referred to as 'CE_RC_REQ') message which requests reconfiguration of a CE 1504, to the CE 1504 (step 1512). Here, the CE_RC_REQ message is a message which provides a command for reconfiguration of the CE 1504 so that the configuration and setting of the CE 1504 are reconfigured according to the coexistence decision making, for the coexistence and frequency sharing of the TVBDs. The CE_RC_REQ message is used in the centralized topology and the distributed topology of the system for managing resources. The contents of the CE_RC_REQ message, that is, the header and payload of the CE_RC_REQ message may be presented as in Table 31.

TABLE 31

| Name | Data Type | Description |
|---|---|---|
| Header | | |
| SourceID | CM ID | Source identifier |
| DestinationID | CE ID | Destination identifier |
| Payload | | |
| CoexistenceMode | COEX_MODE | Coexistence mode such as Individual channel assignment mode Co-channel sharing mode |
| ChannelClassificationList | COEX_CH_CLASSIFICATION | Channel classification list such as Available channel list Restricted channel list Operating channel list |
| ServiceSchedule | COEX_START_END_TIME | Service scheduling, including Start time End time |
| ScheduleUnitInfo | COEX_SCH_UNIT_INFO | Service scheduling, including Reference time Window time Slot time |

The CE 1504 discovers the reconfiguration command for the CE 1504 through the CE_RC_REQ message, transmits a TVBD reconfiguration request (hereinafter, referred to as 'TVBD_RC_REQ') message which provides the reconfiguration command for the CE 1504 to a TVBD 1502 and requests configuration of the TVBD 1502 in correspondence to the reconfiguration command for the CE 1504, to the TVBD 1502 (step 1514), and receives a TVBD reconfiguration response (hereinafter, referred to as 'TVBD_RC_RSP') message, from the TVBD 1502 as a response to the TVBD_RC_REQ message (step 1516).

Then, the CE 1504 transmits a CE reconfiguration response (hereinafter, referred to as 'CE_RC_RSP') message, to the CM 1506 as a response to the CE_RC_REQ message (step 1518). Here, the CE_RC_RSP message is a message which provides a response for the reconfiguration of the CE 1504 to the CM 1506. The CE_RC_RSP message is used in the centralized topology and the distributed topology of the system for managing resources. The contents of the CE_RC_RSP message, that is, the header and payload of the CE_RC_RSP message may be presented as in Table 32.

described above, the system for managing resources performs the reconfiguration procedure for the coexistence and frequency sharing of the plurality of systems, for example, the TVBDs. Hereafter, a management procedure of the system for managing resources in a communication system in accordance with the exemplary embodiment of the present invention will be described in detail with reference to FIG. 17.

Figure 17:
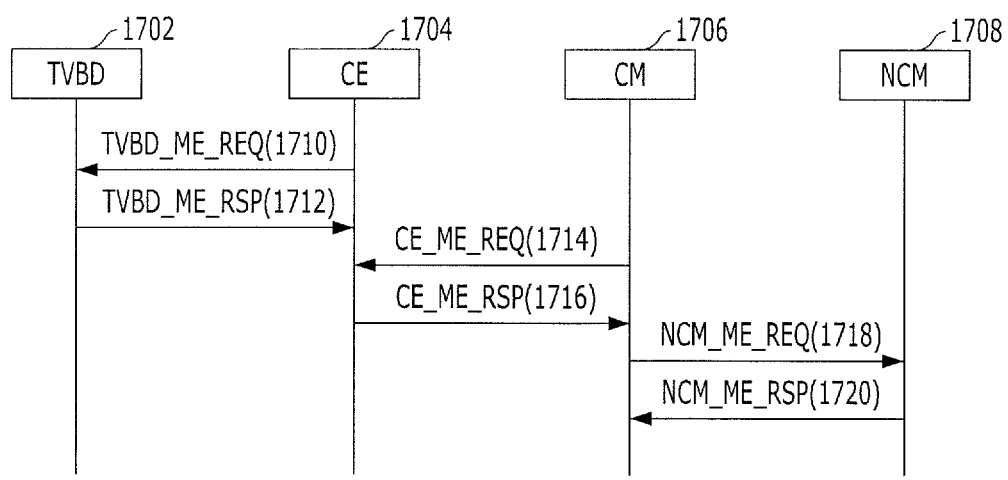
FIG. 17 is a diagram schematically showing a management procedure of the system for managing resources in a communication system in accordance with the exemplary embodiment of the present invention.

FIG. 17 is a diagram schematically showing a management procedure of the system for managing resources in a communication system in accordance with the exemplary embodiment of the present invention. FIG. 17 is a diagram schematically showing a message transmission and reception procedure in the management procedure among the respective objects of the system for managing resources, after the registration procedure, the coexistence information gathering procedure, the coexistence decision making procedure and the reconfiguration procedure in the system for managing resources, for coexistence and frequency sharing of the plurality of systems, for example, the TVBDs, in the TVWS as described above.

Referring to FIG. 17, in order for management of the respective objects of the system for managing resources after

TABLE 32

| Name | Data Type | Description |
|---|---|---|
| Header | | |
| SourceID | CE ID | Source identifier |
| DestinationID | CM ID | Destination identifier |
| Payload | | |
| ReconfigurationParameters | COEX_RC_PARAMETERS | The status information of reconfiguration parameters is provided with accepted values of parameters when reconfiguration is succeed recommended values of parameters when reconfiguration is failed |

In this way, as the respective objects, in particular, the CM transmits and receives messages in the management mode as described above, the system for managing resources performs the reconfiguration procedure for the coexistence and frequency sharing of the plurality of systems, for example, the TVBDs. Hereafter, a reconfiguration procedure in the autonomous mode of the system for managing resources in a communication system in accordance with the exemplary embodiment of the present invention will be described in detail with reference to FIG. 16.

Referring to FIG. 16, in order for reconfiguration after the registration procedure, the coexistence information gathering procedure and the coexistence decision making procedure for the coexistence and frequency sharing of the plurality of systems, for example, the TVBDs, in the TVWS, in the autonomous mode, a CE 1604 discovers a command for reconfiguration of itself, transmits a TVBD_RC_REQ message which provides the reconfiguration command for the CE 1604 to a TVBD 1602 and requests configuration of the TVBD 1602 in correspondence to the reconfiguration command for the CE 1604, to the TVBD 1602 (step 1610), and receives a TVBD_RC_RSP message, from the TVBD 1602 as a response to the TVBD_RC_REQ message (step 1612).

In this way, as the respective objects, in particular, the CE transmits and receives messages in the autonomous mode as the registration procedure, the coexistence information gathering procedure, the coexistence decision making procedure and the reconfiguration procedure for the coexistence and frequency sharing of the plurality of systems, for example, the TVBDs, in the TVWS, a CE 1704 transmits a TVBD management request (hereinafter, referred to as 'TVBD_ME_REQ') message which requests management of a TVBD 1702, to the TVBD 1702 for management of the TVBD 1702 (step 1710), and receives a TVBD management response (hereinafter, referred to as 'TVBD_ME_RSP') message, from the TVBD 1702 as a response to the TVBD_ME_REQ message (step 1712).

Further, a CM 1706 transmits a CE management request (hereinafter, referred to as 'CE_ME_REQ') message which requests management of the CE 1704, to the CE 1704 for management of the CE 1704 (step 1714). Here, the CE_ME_REQ message is a message which requests management of the corresponding CE for management of the CE 1704. The CE_ME_REQ message is used in the centralized topology and the distributed topology of the system for managing resources. The contents of the CE_ME_REQ message, that is, the header and payload of the CE_ME_REQ message may be presented as in Table 33.

TABLE 33

| Name | Data Type | Description |
| --- | --- | --- |
| Header | | |
| SourceID | CM ID | Source identifier |
| DestinationID | CE ID | Destination identifier |
| Payload | | |
| MeasurementType | COEX_ME_TYPE | Measurement list such as TVBD QoS TVBD spectrum sensing |
| ChannelNumberList | SEQUENCE OF INTEGER | Measuring channel number list |
| MeasurementOptions | COEX_ME_OPTIONS | Measurement options such as Measurement duration Measurement frequency range |

The CM 1706 receives a CE management response (hereinafter, referred to as 'CE_ME_RSP') message, from the CE 1704 as a response to the CE_ME_REQ message (step 1716). Here, the CE_ME_RSP message is a message which provides the management result of the CE 1704 for the management request for the CE 1704 according to the CE_ME_REQ message. The CE_ME_RSP message is used in the same manner in the centralized topology and the distributed topology of the system for managing resources. The contents of the CE_ME_RSP message, that is, the header and payload of the CE_ME_RSP message may be presented as in Table 34.

TABLE 34

| Name | Data Type | Description |
| --- | --- | --- |
| Header | | |
| SourceID | CE ID | Source identifier |
| DestinationID | CM ID | Destination identifier |
| Payload | | |
| MeasurementType | COEX_ME_TYPE | Measurement type |
| ChannelNumberList | SEQUENCE OF INTEGER | Measured channel number list |
| MeasurementResults | COEX_ME_RESULTS | Measurement results |
| MeasurementParameters | COEX_ME_OPTIONS | Actual measurement parameters such as Actual measurement duration Actual measurement frequency range |

The CM 1706 transmits an NCM management request (hereinafter, referred to as 'NCM_ME_REQ') message which requests management of an NCM 1708, to the NCM 1708 for management of the NCM 1708 (step 1718). Here, the NCM_ME_REQ message is a message which requests management of the corresponding NCM for the management of the NCM 1708, and is transmitted by the CM 1706 to all NCMs. The NCM_ME_REQ message is used in the centralized topology and the distributed topology of the system for managing resources. In the centralized topology, the MCM transmits the NCM_ME_REQ message to all SCMs, and in the distributed topology, an optional CM transmits the NCM_ME_REQ message to all NCMs. The contents of the NCM_ME_REQ message, that is, the header and payload of the NCM_ME_REQ message may be presented as in Table 35.

TABLE 35

| Name | Data Type | Description |
| --- | --- | --- |
| Header | | |
| SourceID | CM ID/Master CM ID | Source identifier |
| DestinationID | Neighbor CM ID/ Slave CM ID | Destination identifier |
| Payload | | |
| NeighborCEID | STRING | Neighbor CE ID |
| MeasurementType | COEX_ME_TYPE | Measurement list such as TVBD QoS TVBD spectrum sensing |
| ChannelNumberList | SEQUENCE OF INTEGER | Measuring channel number list |
| MeasurementOptions | COEX_ME_OPTIONS | Measurement options such as Measurement duration Measurement frequency range |

Further, the CM 1706 receives an NCM management response (hereinafter, referred to as 'NCM_ME_RSP') message, from the NCM 1708 as a response to the NCM_ME_REQ message (step 1720). Here, the NCM_ME_RSP message is a message which provides the management result of the NCM 1708 for the management request for the NCM 1708 according to the NCM_ME_RSP message. The NCM_ME_RSP message is used in the centralized topology and the distributed topology of the system for managing resources. In the centralized topology, all the SCMs transmit the NCM_ME_RSP message to the MCM, and in the distributed topology, all the NCMs transmit the NCM_ME_RSP message to an optional NCM. The contents of the NCM_ME_RSP message, that is, the header and payload of the NCM_ME_RSP message may be presented as in Table 36.

TABLE 36

| Name | Data Type | Description |
| --- | --- | --- |
| Header | | |
| SourceID | Neighbor CM ID/ Slave CM ID | Source identifier |
| DestinationID | CM ID/Master CM ID | Destination identifier |
| Payload | | |
| NeighborCEID | STRING | Neighbor CE ID |
| MeasurementType | COEX_ME_TYPE | Measurement type |

TABLE 36-continued

| Name | Data Type | Description |
|---|---|---|
| ChannelNumberList | SEQUENCE OF INTEGER | Measured channel number list |
| MeasurementResults | COEX_ME_RESULTS | Measurement results |
| MeasurementParameters | COEX_ME_OPTIONS | Actual measurement parameters such as Actual measurement duration Actual measurement frequency range |

In this way, as the respective objects transmit and receive messages as described above, the system for managing resources performs the management procedure for the coexistence and frequency sharing of the plurality of systems, for example, the TVBDs. Hereafter, an event procedure of the system for managing resources in a communication system in accordance with the exemplary embodiment of the present invention will be described in detail with reference to FIG. 18.

sage which provides a detected event of the TVBD 1802, from the TVBD 1802 as a response to the TVBD_EV_REQ message (step 1822).

Further, a CM 1806 receives a CDIS CM event indication (hereinafter, referred to as 'CDIS_CM_EV_IND') message which indicates a CM event of a CDIS 1808 for providing the CM event detected in the CDIS 1808 in correspondence to the detection of the event corresponding to the CM 1806 in the CDIS 1808, from the CDIS 1808 (step 1824). Here, the CDIS_CM_EV_IND message is a message for providing information for the detected event to the CM 1806 when the CDIS 1808 detects the event corresponding to the CM 1806. The CDIS_CM_EV_IND message is used in the same manner in the centralized topology, the distributed topology and the autonomous mode of the system for managing resources. The contents of the CDIS_CM_EV_IND message, that is, the header and payload of the CDIS_CM_EV_IND message may be presented as in Table 37.

TABLE 37

| Name | Data Type | Description |
|---|---|---|
| Header | | |
| SourceID | CDIS ID | Source identifier |
| DestinationID | CM ID | Destination identifier |
| Payload | | |
| RegisteredCEID | STRING | Registered CE ID |
| TVWSChannelStatus | COEX_TVWSCH_STATUS | TVWS channel information event includes Allowed channel list change Use constraint change This message conveys the detected event and updated information. |
| NeighborInformationStatus | COEX_NEI_CE_INFO_STATUS | Neighbor information event includes Neighbor CE list change Channel classification change of neighbor CE This message conveys the detected event and updated information. |

Figure 18:
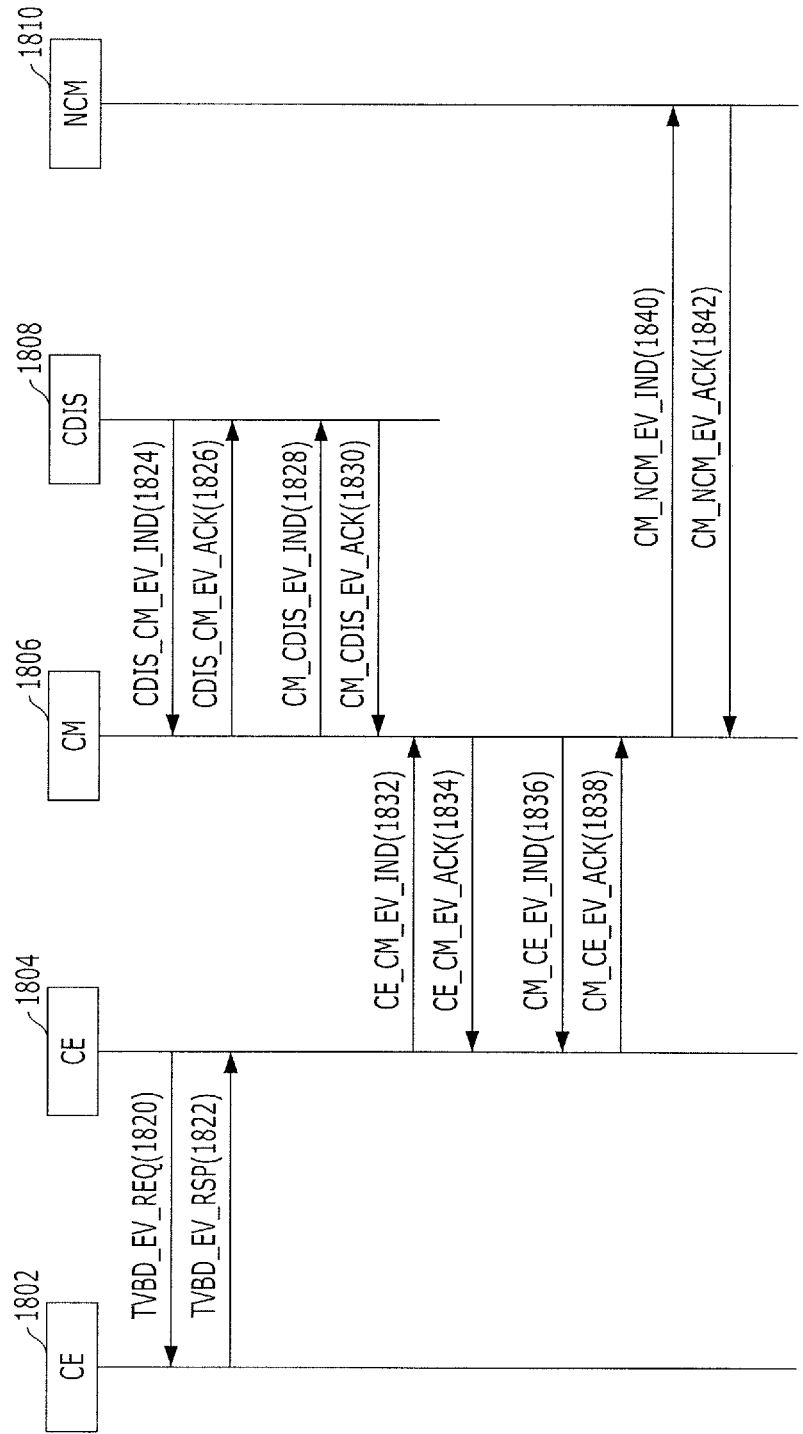
FIG. 18 is a diagram schematically showing an event procedure of the system for managing resources in a communication system in accordance with the exemplary embodiment of the present invention.

FIG. 18 is a diagram schematically showing an event procedure of the system for managing resources in a communication system in accordance with the exemplary embodiment of the present invention. FIG. 18 is a diagram schematically showing a message transmission and reception procedure in the event procedure among the respective objects of the system for managing resources, after the registration procedure, the coexistence information gathering procedure, the coexistence decision making procedure and the reconfiguration procedure in the system for managing resources, for coexistence and frequency sharing of the plurality of systems, for example, the TVBDs, in the TVWS as described above.

Referring to FIG. 18, in order for events among the respective objects of the system for managing resources after the registration procedure, the coexistence information gathering procedure, the coexistence decision making procedure and the reconfiguration procedure for the coexistence and frequency sharing of the plurality of systems, for example, the TVBDs, in the TVWS, a CE 1804 transmits a TVBD event request (hereinafter, referred to as 'TVBD_ME_REQ') message which requests event detection of a TVBD 1802, to the TVBD 1802 (step 1820), and receives a TVBD event response (hereinafter, referred to as 'TVBD_EV_RSP') mes- Further, the CM 1806 transmits a CDIS CM event acknowledgement (hereinafter, referred to as 'CDIS_CM_EV_ACK') message, to the CDIS 1808 as a response to the CDIS_CM_EV_IND message (step 1826). Here, the CDIS_CM_EV_ACK message is a message which is provided to discover the CM event detected in the CDIS 1808 and included in the CDIS_CM_EV_IND message, that is, acknowledge information for the detected event. The CDIS_CM_EV_ACK message is used in the same manner in the centralized topology, the distributed topology and the autonomous mode of the system for managing resources. The contents of the CDIS_CM_EV_ACK message, that is, the header and payload of the CDIS_CM_EV_ACK message may be presented as in Table 38.

TABLE 38

| Name | Data Type | Description |
|---|---|---|
| Header | | |
| SourceID | CM ID | Source identifier |
| DestinationID | CDIS ID | Destination identifier |

TABLE 38-continued

| Name | Data Type | Description |
|---|---|---|
| | | Payload |
| EventAck | BOOLEAN | Acknowledgment of corresponding event as a receipt<br>True: Event receipt is succeed<br>False: Event receipt is failed |

Also, the CM 1806 transmits a CM CDIS event indication (hereinafter, referred to as 'CM_CDIS_EV_IND') message which indicates a CDIS event of the CM 1806 for providing the CDIS event detected in the CM 1806 in correspondence to the detection of the event corresponding to the CDIS 1808 in the CM 1806, to the CDIS 1808 (step 1828). Here, the CM_CDIS_EV_IND message is a message for providing information for the detected event to the CDIS 1808 in the case where the CM 1806 detects the event corresponding to the CDIS 1808. The CM_CDIS_EV_IND message is used in the same manner in the centralized topology, the distributed topology and the autonomous mode of the system for managing resources. The contents of the CM_CDIS_EV_IND message, that is, the header and payload of the CM_CDIS_EV_IND message may be presented as in Table 39.

TABLE 39

| Name | Data Type | Description |
|---|---|---|
| | Header | |
| SourceID | CM ID | Source identifier |
| DestinationID | CDIS ID | Destination identifier |
| | Payload | |
| RegisteredCMStatus | COEX_REG_CM_STATUS | Registered CM event includes<br>Registered CE ID list change<br>Information change of the registered CE<br>This message conveys the detected event and updated information. |
| ChannelClassificationStatus | COEX_CH_CLASSIFICATION_STATUS | Channel classification event includes<br>Channel classification change of the registered CE<br>This message conveys the detected event and updated information. |

Further, the CM 1806 receives a CM CDIS event acknowledgement (hereinafter, referred to as 'CM_CDIS_EV_ACK') message, from the CDIS 1808 as a response to the CM_CDIS_EV_IND message (step 1830). Here, the CM_CDIS_EV_ACK message is a message which is provided to discover the CDIS event detected in the CM 1806 and included in the CM_CDIS_EV_IND message, that is, acknowledge information for the detected event. The CM_CDIS_EV_ACK message is used in the same manner in the centralized topology, the distributed topology and the autonomous mode of the system for managing resources. The contents of the CM_CDIS_EV_ACK message, that is, the header and payload of the CM_CDIS_EV_ACK message may be presented as in Table 40.

TABLE 40

| Name | Data Type | Description |
|---|---|---|
| | | Header |
| SourceID | CDIS ID | Source identifier |
| DestinationID | CM ID | Destination identifier |
| | | Payload |
| EventAck | BOOLEAN | Acknowledgment of corresponding event as a receipt<br>True: Event receipt is succeed<br>False: Event receipt is failed |

The CM 1806 receives a CE CM event indication (hereinafter, referred to as 'CE_CM_EV_IND') message which indicates a CM event of the CE 1804 for providing the CM event detected in the CE 1804 in correspondence to the detection of the event corresponding to the CM 1806 in the CE 1804, from the CE 1804 (step 1832). Here, the CE_CM_EV_IND message is a message for providing information for the detected event, to the CM 1806 in the case where the CE 1804 detects the event corresponding to the CM 1806. The CE_CM_EV_IND message is used in the same manner in the centralized topology, the distributed topology and the autonomous mode of the system for managing resources. The contents of the CE_CM_EV_IND message, that is, the header and payload of the CE_CM_EV_IND message may be presented as in Table 41.

TABLE 41

| Name | Data Type | Description |
|---|---|---|
| Header | | |
| SourceID | CE ID | Source identifier |
| DestinationID | CM ID | Destination identifier |
| Payload | | |
| RegisteredCEStatus | COEX_REG_CE_STATUS | Registered CE's event, subscribed to discovery service, includes<br>TVBD geolocation change<br>TVBD TVWS DB channel list change<br>TVBD interference range change<br>Registered CE's event, subscribed to information service, includes<br>CE's event of discovery service<br>TVBD operating channel list change<br>Registered CE's event, subscribed to management service, includes<br>CE's event of information service<br>TVBD QoS change<br>TVBD service duty cycle change<br>TVBD service bandwidth change<br>TVBD service coverage change<br>This message conveys the detected event and to give updated information. |

The CM 1806 transmits a CE CM event acknowledgement (hereinafter, referred to as 'CE_CM_EV_ACK') message, to the CE 1804 as a response to the CE_CM_EV_IND message (step 1834). Here, the CE_CM_EV_ACK message is a message which is provided to discover the CM event detected in the CE 1804 and included in the CE_CM_EV_IND message, that is, acknowledge information for the detected event. The CE_CM_EV_ACK message is used in the same manner in the centralized topology, the distributed topology and the autonomous mode of the system for managing resources. The contents of the CE_CM_EV_ACK message, that is, the header and payload of the CE_CM_EV_ACK message may be presented as in Table 42.

TABLE 42

| Name | Data Type | Description |
|---|---|---|
| Header | | |
| SourceID | CM ID | Source identifier |
| DestinationID | CE ID | Destination identifier |
| Payload | | |
| EventAck | BOOLEAN | Acknowledgment of corresponding event as a receipt<br>True: Event receipt is succeed<br>False: Event receipt is failed |

The CM 1806 transmits a CM CE event indication (hereinafter, referred to as 'CM_CE_EV_IND') message which indicates a CE event of the CM 1806 for providing the CE event detected in the CM 1806 in correspondence to the detection of the event corresponding to the CE 1804 in the CM 1806, to the CE 1804 (step 1836). Here, the CM_CE_EV_IND message is a message for providing information for the detected event to the CE 1804 in the case where the CM 1806 detects the event corresponding to the CE 1804. The CM_CE_EV_IND message is used in the same manner in the centralized topology, the distributed topology and the autonomous mode of the system for managing resources. The contents of the CM_CE_EV_IND message, that is, the header and payload of the CM_CE_EV_IND message may be presented as in Table 43.

TABLE 43

| Name | Data Type | Description |
|---|---|---|
| Header | | |
| SourceID | CM ID | Source identifier |
| DestinationID | CE ID | Destination identifier |
| Payload | | |
| NDStatus | COEX_ND_STATUS | Registered CM event for discovery service, includes<br>Neighbor discovery event such as<br>Neighbor discovery done<br>Neighbor CE list change<br>Registered CM event for information service, includes<br>CM's event of discovery service<br>TVBD information change of neighbor CE |

TABLE 43-continued

| Name | Data Type | Description |
|---|---|---|
| | | Channel classification change of neighbor CE This message conveys the detected event and updated information. |

The CM 1806 receives a CM CE event acknowledgement (hereinafter, referred to as 'CM_CE_EV_ACK') message, from the CE 1804 as a response to the CM_CE_EV_IND message (step 1838). Here, the CM_CE_EV_ACK message is a message which is provided to discover the CE event detected in the CM 1806 and included in the CM_CE_EV_IND message, that is, acknowledge information for the detected event. The CM_CE_EV_ACK message is used in the same manner in the centralized topology, the distributed topology and the autonomous mode of the system for managing resources. The contents of the CM_CE_EV_ACK message, that is, the header and payload of the CM_CE_EV_ACK message may be presented as in Table 44.

TABLE 44

| Name | Data Type | Description |
|---|---|---|
| | Header | |
| SourceID | CE ID | Source identifier |
| DestinationID | CM ID | Destination identifier |
| | Payload | |
| EventAck | BOOLEAN | Acknowledgment of corresponding event as a receipt True: Event receipt is succeed False: Event receipt is failed |

The CM 1806 transmits a CM NCM event indication (hereinafter, referred to as 'CM_NCM_EV_IND') message which indicates an NCM event of the CM 1806 for providing the NCM event detected in the CM 1806 in correspondence to the detection of the event corresponding to an NCM 1810 in the CM 1806, to the NCM 1810 (step 1840). Here, the CM_NCM_EV_IND message is a message for providing information for the detected event to the NCM 1810 in the case where the CM 1806 detects the event corresponding to the NCM 1810. The CM_NCM_EV_IND message is used in the centralized topology and the distributed topology of the system for managing resources. In the centralized topology, in order for the MCM to detect an event corresponding to an SCM and provide information of the detected event to the SCM, the MCM transmits the CM_NCM_EV_IND message to the SCM, and in the distributed topology, in order for an optional CM to detect an event corresponding to an NCM and provide information of the detected event to the NCM, the optional CM transmits the CM_NCM_EV_IND message to the NCM. The contents of the CM_NCM_EV_IND message, that is, the header and payload of the CM_NCM_EV_IND message may be presented as in Table 45.

TABLE 45

| Name | Data Type | Description |
|---|---|---|
| | Header | |
| SourceID | CM ID/Slave CM ID | Source identifier |
| Destination ID | Neighbor CM ID/ | Destination |

TABLE 45-continued

| Name | Data Type | Description |
|---|---|---|
| | Master CM ID | identifier |
| | Payload | |
| ChannelUseStatus | COEX_CH_USE_STATUS | Channel use status such as New TVBD TVBD information change Scheduled service time end |

The CM 1806 receives a CM NCM event acknowledgement (hereinafter, referred to as 'CM_NCM_EV_ACK') message, from the NCM 1810 as a response to the CM_NCM_EV_IND message (step 1842). Here, the CM_NCM_EV_ACK message is a message which is provided to discover the NCM event detected in the CM 1806 and included in the CM_NCM_EV_IND message, that is, acknowledge information for the detected event. The CM_NCM_EV_ACK message is used in the centralized topology and the distributed topology of the system for managing resources. In the centralized topology, in order for the SCM to provide acknowledgement of the event information, the SCM transmits the CM_NCM_EV_ACK message to the MCM, and in the distributed topology, in order for the NCM to provide acknowledgement of the event information, the NCM transmits the CM_NCM_EV_ACK message to the CM. The contents of the CM_NCM_EV_ACK message, that is, the header and payload of the CM_NCM_EV_ACK message may be presented as in Table 46.

TABLE 46

| Name | Data Type | Description |
|---|---|---|
| | Header | |
| SourceID | Neighbor CM ID/ Master CM ID | Source identifier |
| DestinationID | CM ID/Slave CM ID | Destination identifier |
| | Payload | |
| EventAck | BOOLEAN | Acknowledgment of corresponding event as a receipt True: Event receipt is succeed False: Event receipt is failed |

In this way, as the respective objects transmit and receive messages as described above in the case where events for corresponding objects are detected in the respective objects, the system for managing resources performs the event procedure for the coexistence and frequency sharing of the plurality of systems, for example, the TVBDs.

As is apparent from the above descriptions, in accordance with the embodiments of the present invention, frequency resources are managed such that a plurality of systems can use available frequency bands among frequency bands used in advance like a TV band through coexistence and frequency sharing in a communication system, thereby allowing efficient use of limited frequency resources and improving frequency resource utilization efficiency.

While the present invention has been described with respect to the specific embodiments, it will be apparent to those skilled in the art that various changes and modifications may be made without departing from the spirit and scope of the invention as defined in the following claims.

What is claimed is:

1. A system for managing resources in a communication system including a plurality of systems which do not have a permission for a first frequency band, the system comprising:
   a coexistence manager configured to, when a frequency band available for the plurality of systems is searched from the first frequency band, manage the plurality of systems for coexistence and frequency sharing of the plurality of systems in the available frequency band;
   a coexistence enabler configured to transmit and receive information of the plurality of systems and information of the coexistence manager; and
   a coexistence discovery and information server configured to support control of the coexistence manager over the plurality of systems,
   wherein a plurality of coexistence managers are provided to respectively correspond to the plurality of systems, and
   wherein predetermined messages are transmitted and received among the coexistence discovery and information server, the plurality of coexistence managers and the coexistence enabler to perform a registration procedure, a coexistence information gathering procedure, a coexistence decision making procedure, a reconfiguration procedure, a management procedure and an event procedure, for the coexistence and frequency sharing of the plurality of systems.

2. The system of claim 1, wherein the messages include headers, payloads and data types, and are transmitted and received among corresponding objects in the procedures.

3. The system of claim 2, wherein, in the registration procedure, the coexistence discovery and information server, the plurality of coexistence managers and the coexistence enabler respectively transmit registration request messages and respectively receive registration response messages as responses to the registration request messages.

4. The system of claim 3, wherein, among the plurality of coexistence managers, slave coexistence managers transmit the registration request messages to a master coexistence manager and receive the registration response messages from the master coexistence manager.

5. The system of claim 3, wherein, among the plurality of coexistence managers, optional coexistence managers transmit the registration request messages to neighbor coexistence managers and receive the registration response messages from the neighbor coexistence managers.

6. The system of claim 3, wherein, after the registration procedure, in a deregistration procedure, the coexistence discovery and information server, the plurality of coexistence managers and the coexistence enabler respectively transmit deregistration request messages and respectively receive deregistration response messages as responses to the deregistration request messages.

7. The system of claim 6, wherein, among the plurality of coexistence managers, slave coexistence managers transmit the deregistration request messages to a master coexistence manager and receive the deregistration response messages from the master coexistence manager.

8. The system of claim 6, wherein, among the plurality of coexistence managers, optional coexistence managers transmit the deregistration request messages to neighbor coexistence managers and receive the deregistration response messages from the neighbor coexistence managers.

9. The system of claim 2, wherein, in the coexistence information gathering procedure, the coexistence discovery and information server, the plurality of coexistence managers and the coexistence enabler respectively transmit coexistence information request messages which request coexistence information and respectively receive coexistence information response messages which include the coexistence information, as responses to the coexistence information request messages.

10. The system of claim 9, wherein, among the plurality of coexistence managers, optional coexistence managers transmit the coexistence information request messages to neighbor coexistence managers and receive the coexistence information response messages from the neighbor coexistence managers.

11. The system of claim 10, wherein, in the coexistence decision making procedure, the optional coexistence managers transmit negotiation request messages which include negotiation information, to the neighbor coexistence managers, perform coexistence decision making on the basis of the negotiation information and the coexistence information, receive negotiation response messages from the neighbor coexistence managers as responses to the negotiation request messages, and transmit negotiation indication messages which indicate completion of negotiation, to the neighbor coexistence managers.

12. The system of claim 9, wherein, in the coexistence decision making procedure, among the plurality of coexistence managers, a master coexistence manager transmits the coexistence information request messages to slave coexistence managers, receives the coexistence information response messages from the slave coexistence managers, performs coexistence decision making on the basis of the coexistence information, transmits command request messages to the slave coexistence managers, and receives command response messages from the slave coexistence managers as responses to the command request messages.

13. The system of claim 9, wherein the coexistence information includes information regarding a coexistence mode, operating channel selection and a co-channel sharing mechanism.

14. The system of claim 2, further comprising:
   a TVWS (TV white space) database configured to provide channel information of the available frequency band,
   wherein, in the coexistence decision making procedure, the coexistence enabler transmits channel classification request messages which request channel classification information, to the TVWS database and the coexistence managers, receives channel classification response messages which include the channel classification information, as responses to the channel classification request messages, and performs coexistence decision making on the basis of operating channel selection in the channel classification information.

15. The system of claim 2, wherein, in the reconfiguration procedure, the coexistence managers and the coexistence enabler respectively transmit reconfiguration request messages and respectively receive reconfiguration response messages as responses to the reconfiguration request messages.

16. The system of claim 2, wherein, in the management procedure, the plurality of coexistence managers and the coexistence enabler respectively transmit management request messages and respectively receive management response messages as responses to the management request messages.

17. The system of claim 16, wherein, among the plurality of coexistence managers, optional coexistence managers transmit the management request messages to neighbor coexistence managers and receive the management response messages from the neighbor coexistence managers.

18. The system of claim 2, wherein, in the event procedure, the coexistence discovery and information server, the plurality of coexistence managers and the coexistence enabler respectively transmit event indication messages which indicate event detection and respectively receive event acknowledgement messages as responses to the event indication messages.

19. The system of claim 18, wherein, among the plurality of coexistence managers, optional coexistence managers transmit the event indication messages to neighbor coexistence managers and receive the event acknowledgement messages from the neighbor coexistence managers.

20. A method for managing resources of a first frequency band in a communication system including a plurality of systems which do not have a permission for the first frequency band, the method comprising:

transmitting and receiving, when a frequency band available for the plurality of systems is searched from the first frequency band, registration request messages and registration response messages among a coexistence discovery and information server, a plurality of coexistence managers and a coexistence enabler, in a registration procedure, for coexistence and frequency sharing of the plurality of systems in the available frequency band;

transmitting and receiving coexistence information request messages and coexistence information response messages among the coexistence discovery and information server, the plurality of coexistence managers and the coexistence enabler, in a coexistence information gathering procedure, for the coexistence and frequency sharing of the plurality of systems;

transmitting and receiving command request messages and command response messages and negotiation request messages and negotiation response messages among the plurality of coexistence managers, and transmitting and receiving channel classification request messages and channel classification response messages by the coexistence enabler, in a coexistence decision making procedure, for the coexistence and frequency sharing of the plurality of systems;

transmitting and receiving reconfiguration request messages and reconfiguration response messages by the plurality of coexistence managers and the coexistence enabler, in a reconfiguration procedure, for the coexistence and frequency sharing of the plurality of systems;

transmitting and receiving management request messages and management response messages by the plurality of coexistence managers and the coexistence enabler, in a management procedure, for the coexistence and frequency sharing of the plurality of systems; and transmitting and receiving event indication messages and event acknowledgement messages among the coexistence discovery and information server, the plurality of coexistence managers and the coexistence enabler, in an event procedure, for the coexistence and frequency sharing of the plurality of systems.

* * * * *